(12) United States Patent
Ogino

(10) Patent No.: US 11,748,050 B2
(45) Date of Patent: Sep. 5, 2023

(54) NETWORK PRINTING SERVICE USING INSTANT MESSAGING

(71) Applicant: SHARP KABUSHIKI KAISHA, Sakai (JP)

(72) Inventor: Sintarou Ogino, Ota (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/701,254

(22) Filed: Mar. 22, 2022

(65) Prior Publication Data

US 2022/0214846 A1    Jul. 7, 2022

Related U.S. Application Data

(63) Continuation of application No. 17/123,946, filed on Dec. 16, 2020, now abandoned.

(30) Foreign Application Priority Data

Dec. 17, 2019   (JP) .................................. 2019-227668

(51) Int. Cl.
*G06F 3/12*    (2006.01)
*H04L 51/046*  (2022.01)

(52) U.S. Cl.
CPC .......... *G06F 3/1268* (2013.01); *G06F 3/1203* (2013.01); *G06F 3/126* (2013.01); *G06F 3/1286* (2013.01); *G06F 3/1288* (2013.01); *G06F 3/1293* (2013.01); *H04L 51/046* (2013.01)

(58) Field of Classification Search
None
See application file for complete search history.

(56) References Cited

U.S. PATENT DOCUMENTS

| | | | |
|---|---|---|---|
| 11,252,283 | B2 * | 2/2022 | Hiramatsu ............. G06F 3/127 |
| 2002/0016833 | A1 | 2/2002 | Yajima et al. |
| 2013/0141752 | A1 | 6/2013 | Nishida |
| 2014/0055814 | A1 | 2/2014 | Eguchi |
| 2014/0376040 | A1 | 12/2014 | Shiratori |
| 2015/0172505 | A1 | 6/2015 | Park et al. |
| 2016/0342370 | A1 | 11/2016 | Yasuda et al. |
| 2017/0269889 | A1 | 9/2017 | Nobutani et al. |

(Continued)

FOREIGN PATENT DOCUMENTS

| | | |
|---|---|---|
| CN | 107894878 A | 4/2018 |
| CN | 110223456 A | 9/2019 |

(Continued)

OTHER PUBLICATIONS

English language machine translation of JP 2009-043240 A to Ferlitsch (Year: 2009).*

*Primary Examiner* — Eric A. Rust
(74) *Attorney, Agent, or Firm* — ScienBiziP, P.C.

(57) ABSTRACT

To provide an image forming apparatus including a message acquirer that acquires messages from a server that provides messages posted from a plurality of devices to each of the plurality of devices in a chronological order, a print data generator that generates print data, based on the acquired message, a message determiner that determines whether a print execution phrase is included in the acquired message, and a print data output controller that performs control to output the print data if it is determined that the print execution phrase is included.

2 Claims, 19 Drawing Sheets

(56) References Cited

U.S. PATENT DOCUMENTS

| | | | |
|---|---|---|---|
| 2018/0039464 A1 | 2/2018 | Nobutani et al. | |
| 2018/0210683 A1* | 7/2018 | Tan | H04N 1/00244 |
| 2019/0205075 A1 | 7/2019 | Nobutani et al. | |
| 2021/0055897 A1* | 2/2021 | Tomihisa | H04L 51/10 |

FOREIGN PATENT DOCUMENTS

| | | | |
|---|---|---|---|
| JP | H10210195 A | | 8/1998 |
| JP | 2009-043240 A | * | 2/2009 |
| JP | 2010064404 A | | 3/2010 |
| JP | 2013120427 A | | 6/2013 |
| JP | 2014040078 A | | 3/2014 |
| JP | 2015028673 A | | 2/2015 |
| JP | 2016215529 A | | 12/2016 |
| JP | 2017169054 A | | 9/2017 |

* cited by examiner

FIG. 3

| POSTING SOURCE USER ID | POSTING DESTINATION USER ID | POSTING DATE AND TIME | POSTED CONTENT |
|---|---|---|---|
| : | : | : | : |
| User1 | MFP1 | 2019/01/28 10:00:01 | I WANT TO PRINT |
| User1 | MFP1 | 2019/01/28 10:00:09 | IMAGE DATA (/data/Image.jpg) |
| MFP1 | User1 | 2019/01/28 10:00:11 | I AM NOT BUSY NOW! |
| User1 | MFP1 | 2019/01/28 10:00:21 | EXECUTE PRINTING |
| MFP1 | User1 | 2019/01/28 10:00:23 | WHICH SIZE? |
| : | : | : | : |
| MFP1 | User1 | 2019/01/28 10:01:10 | SETTING IS COMPLETED. PLEASE DECIDE A PRINT EXECUTION PHRASE. |
| User1 | MFP1 | 2019/01/28 10:01:21 | THIS IS OGINO. PLEASE EXECUTE PRINTING |
| MFP1 | User1 | 2019/01/28 10:01:23 | THE PRINT EXECUTION PHRASE IS RECEIVED. |
| : | : | : | : |

| PRINT INFORMATION ID | PRINT DATA NAME | POSTING SOURCE USER ID | OUTPUT CONDITIONS ||||||  PRINT EXECUTION PHRASE |
|---|---|---|---|---|---|---|---|---|
| | | | SHEET SIZE | COLOR MODE | SHEET MODE | SIMPLEX/ DUPLEX PRINTING | NO. OF OUTPUT COPIES | |
| 0001 | 0001.jpg | User1 | A4 | COLOR | PHOTO | SIMPLEX PRINTING | 1 | THIS IS OGINO. PLEASE EXECUTE PRINTING |
| 0002 | 0002.jpg | User6 | A3 | COLOR | PLAIN PAPER | SIMPLEX PRINTING | 2 | PLEASE PRINT |
| 0003 | 0006.png | User4 | A4 | MONOCHROME | PLAIN PAPER | DUPLEX PRINTING | 6 | EXECUTE PRINTING |
| ... | ... | ... | ... | ... | ... | ... | ... | ... |

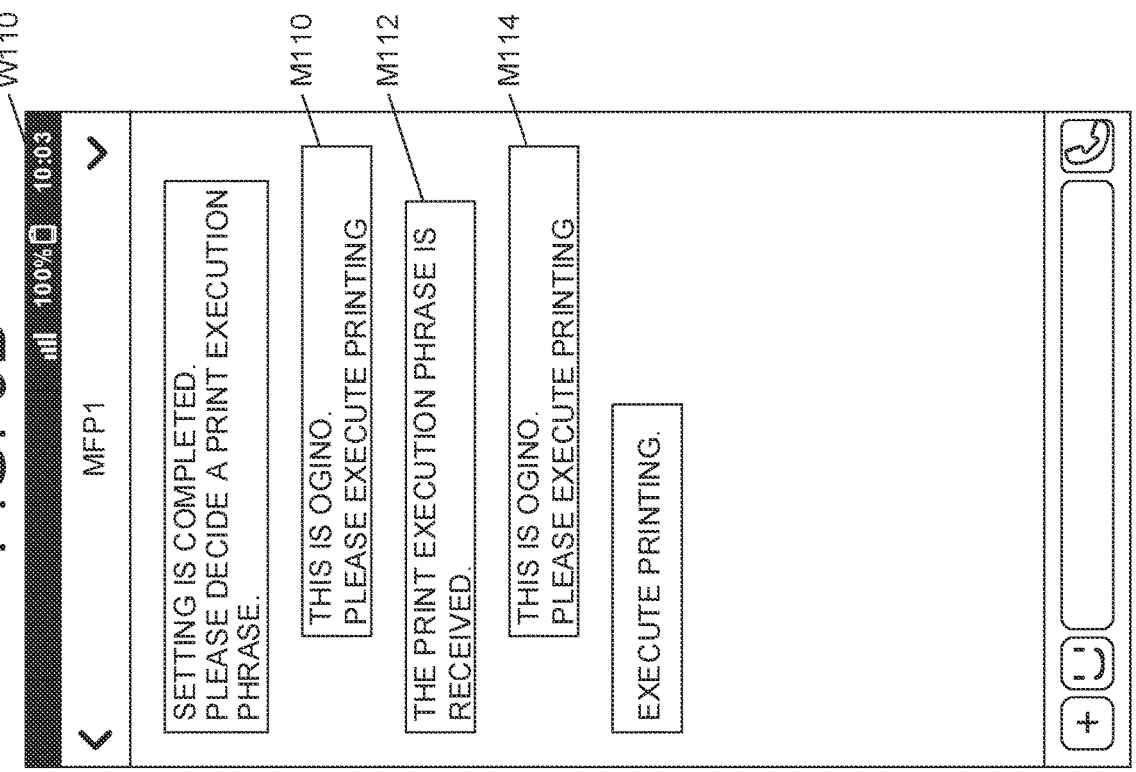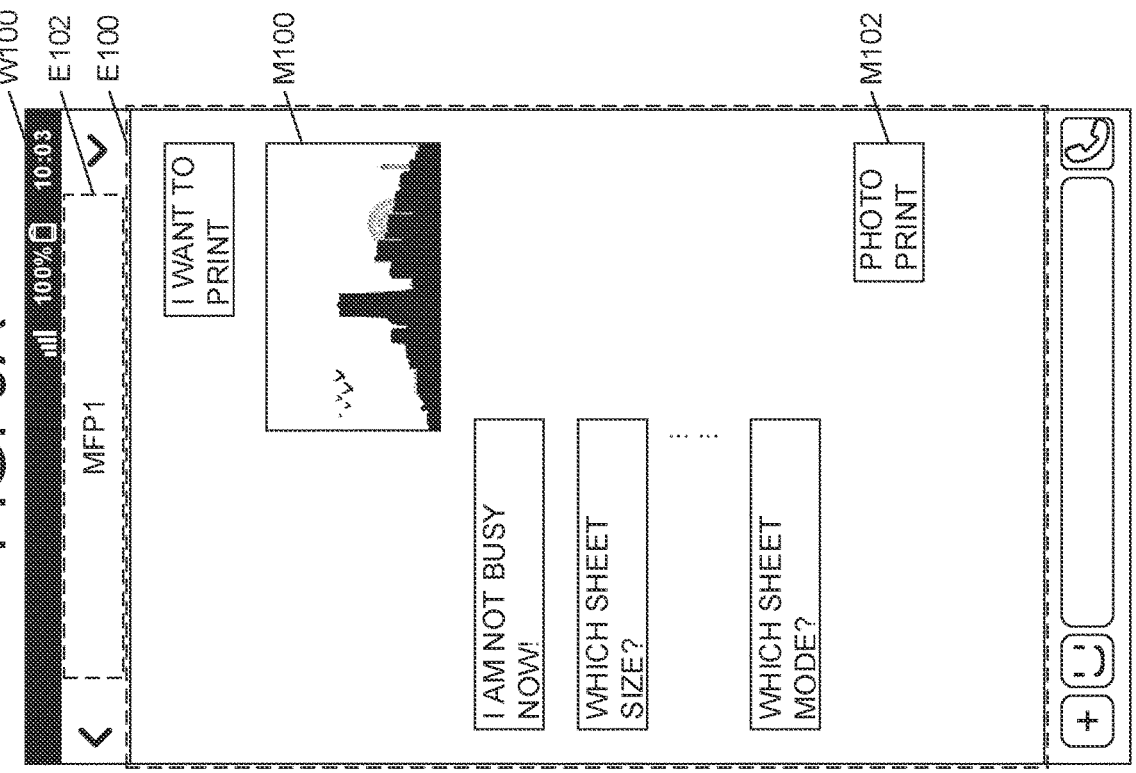

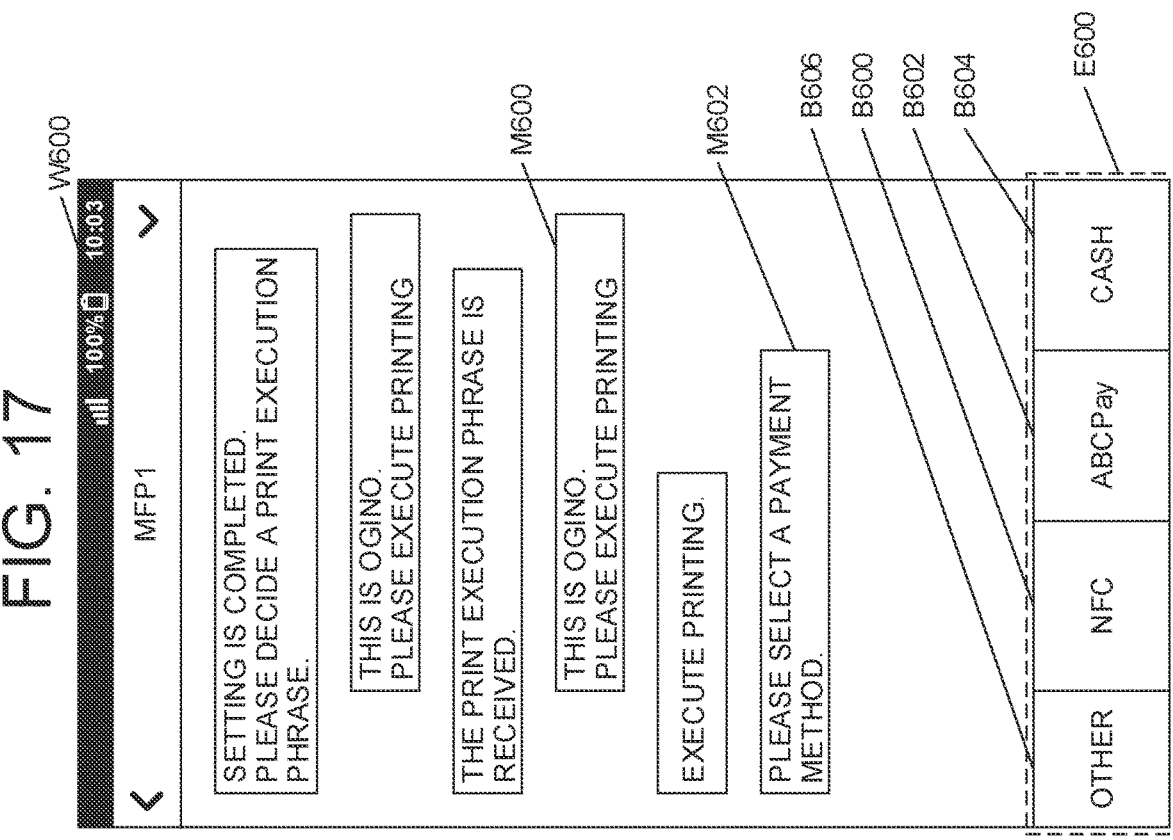

NETWORK PRINTING SERVICE USING INSTANT MESSAGING

CROSS-REFERENCE TO RELATED APPLICATION

The present application is a continuation application of U.S. patent application Ser. No. 17/123,946, filed on Dec. 16, 2020, which claims priority from Japanese Application JP2019-227668, the content of which is hereby incorporated by reference into this application.

BACKGROUND OF THE INVENTION

Field of the Invention

The present invention relates to an image forming apparatus, and the like.

Description of the Background Art

Conventionally, there is provided a so-called net print service allowing a user to output image data prepared in advance in a multifunction peripheral installed in a public space (public place) such as a store.

For example, there is proposed a technique in which an e-mail. address is assigned to a printing device and a user transmits an e-mail containing an attached file to the e-mail address assigned to the printing device to print the attached file from the printing device (see, for example, Japanese Unexamined Patent Application Publication No. 2003-167694 (hereinafter, referred to as Patent Document 1)).

In recent years, so-called instant messaging services allowing messages to be transmitted and received with a simple operation are widely used. The use of a multifunctional peripheral installed in a public space requires simplicity, and therefore, it is desirable that the multifunctional peripheral be operable by using instant messaging services. However, the technique described in Patent Document 1 is a technique using an e-mail, and no consideration is given to a case where an instant messaging service is used.

In view of the above-mentioned problems, an object of the present invention is to provide an image forming apparatus or the like capable of generating and outputting print data, based on an acquired message.

SUMMARY OF THE INVENTION

To resolve the above-described problems, an image forming apparatus according to the present invention includes a message acquirer that acquires a message from a server that provides messages posted from a plurality of devices to each of the plurality of devices in a chronological order,
a print data generator that generates print data, based on the acquired message,
a message determiner that determines whether a print execution phrase is included in the acquired message, and
a print data output controller that performs control to output the print data if it is determined that the print execution phrase is included.

A control method according to the present invention includes
acquiring messages from a server that provides messages posted from a plurality of devices to each of the plurality of devices in a chronological order,
generating print data, based on the acquired message,
determining whether a print execution phrase is included in the acquired message, and
performing control to output the print data if it is determined that the print execution phrase is included.

A non-transitory computer-readable storage medium for storing a program according to the present invention causes
a computer to execute functions of
acquiring messages from a server that provides messages posted from a plurality of devices to each of the plurality of devices in a chronological order,
generating print data, based on the acquired message,
determining whether a print execution phrase is included in the acquired message, and
performing control to output the print data if it is determined that the print execution phrase is included.

According to the present invention, it is possible to generate and output print data, based on the acquired message.

BRIEF DESCRIPTION OF THE DRAWINGS

FIG. 3 is a table showing an example of a data configuration of messages according to the first embodiment;

FIG. 6 is a table showing an example of a data configuration of print information according to the first embodiment;

FIG. 9A and FIG. 9B are diagrams for describing an operation example according to the first embodiment;

FIG. 17 is a diagram for describing an operation example according to a sixth embodiment;

DESCRIPTION OF THE PREFERRED EMBODIMENTS

An embodiment of the present invention will be described below with reference to the drawings. In the present embodiment, as an example, a system including an image forming apparatus to which the present invention is applied will be described.

1. First Embodiment

1.1 Overall Configuration

Figure 1:
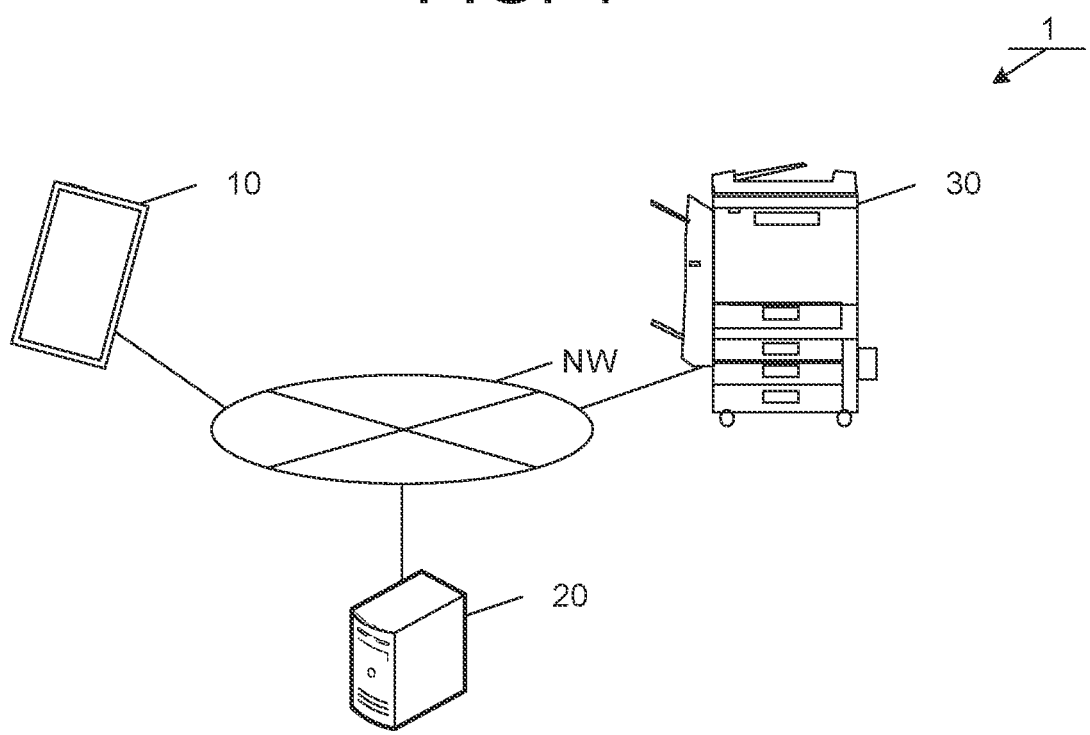
FIG. 1 is a diagram for describing an overall configuration of a system according to a first embodiment.

An overall configuration of a printing system 1 according to the present embodiment will be described with reference to FIG. 1. As illustrated in FIG. 1, the printing system 1 includes a terminal device 10, a server device 20, and an image forming apparatus 30, which are connected via a network NW. The network NW may include an external network such as the Internet, or may include a local area network (LAN) or the like.

The terminal device 10 is an information processing device, and includes a device such as a smartphone, a tablet, and a personal computer (PC). Further, the server device 20 is an information processing device that provides a function to enable transmitting/receiving of messages among a plurality of devices (hereinafter, referred to as "message transmitting/receiving function"). In the present embodiment, transmitting of a message from a device such as the terminal device 10 to the server device 20 is described as posting, and receiving of a message by a device such as the terminal device 10 from the server device 20 is described as acquiring.

The message in this embodiment means data posted to the server device 20. The message may include necessary information such as information on a posting source indicating a user posting the message, information on a posting destination indicating a user to whom the message is sent, and information such as a body of the message (posted content).

When a message is posted, the server device 20 stores the posted message. If there is a request for provision of a message from a device used by a user of the message transmitting/receiving function, the server device 20 provides (transmits), to the device used by the user, the message in which the user requesting the provision of the message is the posting destination. The device requesting the provision of the message acquires the message provided by the server device 20. The request for provision of a message is realized, for example, by transmitting a request or command indicating a request for the provision of the message from a device using the message transmitting/receiving function to the server device 20. In this way, the server device 20 stores messages posted from a plurality of devices connected to the server device 20, and provides in a chronological order, to each of the plurality of devices, a message in which a user using each of the plurality of devices is a posting destination.

By executing an application for using the message transmitting/receiving function (hereinafter, referred to as the "messenger application"), the terminal device 10 may post a message to the server device 20 or acquire a message from the server device 20.

The posted content may be text data or information indicating an image. The information indicating an image may be, for example, the image data itself, or information (such as a uniform resource locator (URL) or a file name) indicating a location of the image data. In the present embodiment, a message with a posted content being text data is described as a text message, and a message with a posted content being information indicating an image is described as an image message.

The image forming apparatus 30 is an apparatus for performing output based on print data by forming an image based on the print data on a recording sheet or the like, and is a so-called multifunction peripheral. The print data is data that can be output by the image forming apparatus 30, and is, for example, file data such as image data or PDF.

The image forming apparatus 30 according to the present embodiment is also an apparatus using the message transmitting/receiving function, and posts messages to the server device 20 and acquires messages from the server device 20. Upon acquiring an image message to be transmitted to the image forming apparatus 30, the image forming apparatus 30 according to the present embodiment generates print data based on the image data, in accordance with the information indicating the image, and forms an image based on the generated print data onto a recording sheet or the like.

1.2 Functional Configuration

1.2.1 Terminal Device

Figure 2:
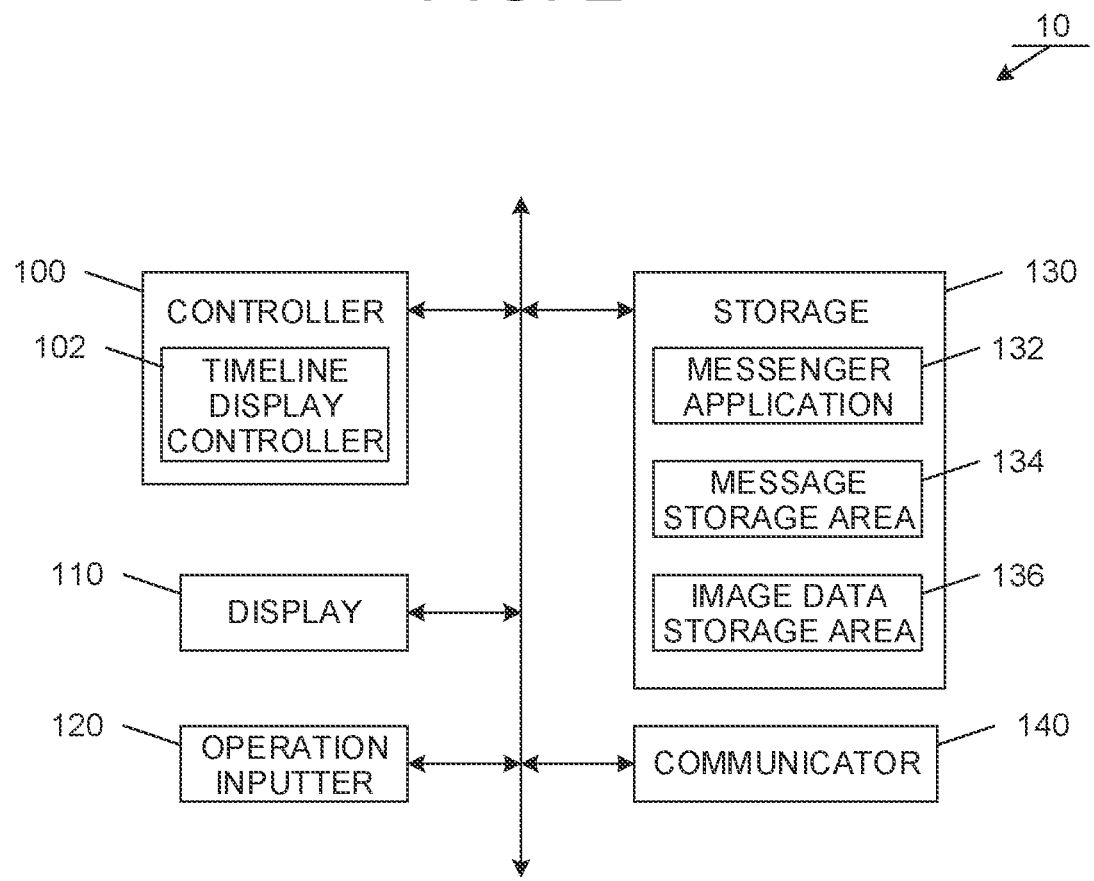
FIG. 2. is a diagram for describing a functional configuration of a terminal device according to the first embodiment.

A functional configuration of the terminal device 10 will be described with reference to FIG. 2. As illustrated in FIG. 2, the terminal device 10 includes a controller 100, a display 110, an operation inputter 120, a storage 130, and a communicator 140.

The controller 100 is a functional element that controls the entire terminal device 10. The controller 100 realizes various types of functions by reading and executing various types of programs, and includes, for example, one or more central processing units (CPU).

The controller 100 also functions as a timeline display controller 102 by reading and executing a messenger application 132 described later. The timeline display controller 102 reads messages stored in a message storage area 134, and controls to arrange information included in the messages in the order of a date and time when the message are posted and display the information on the display 110. A display in which the messages are arranged in a chronological order in this way is referred to as a "timeline" in the present embodiment.

The timeline display controller 102 updates the timeline at a predetermined timing. The timing for updating the timeline by the timeline display controller 102 includes a time when a message is posted by a user, a time when a message is acquired from the server device 20, a time at predetermined time intervals, and a time when an operation for re-displaying the timeline is performed by a user.

The display 110 is a functional element that displays various types of information to the user, and includes, for example, a liquid crystal display (LCD). The operation inputter 120 is a functional element on which the user performs various types of operations, and includes, for example, a touch panel overlaid and provided on the display 110. Touch detection through the touch panel is realized by a well-known technique including an electrostatic induction method and a pressure-sensitive method. The operation inputter 120 includes various operation devices such as a mouse and a keyboard.

The storage 130 is a functional element that stores various types of programs and various types of data necessary for an operation of the terminal device 10. The storage 130 includes, for example, a solid state drive (SSD) being a semiconductor memory, and a hard disk drive (HDD).

The storage 130 stores the messenger application 132, and secures the message storage area 134 and an image data storage area 136.

The messenger application 132 is an application for using the message transmitting/receiving function. When a user performs an operation of posting a message, the messenger application 132 generates a message including information of a posted content input by the user, a posting destination and a posting source, and the like, and posts the message to the server device 20. When an operation of acquiring a message is performed by a user, or when a notification indicating that a message addressed to the user of the terminal device 10 is posted is received from the server device 20, the messenger application 132 requests the server device 20 to provide the message. If the message is provided from the server device 20, the messenger application 132 acquires the provided message and stores the message in the message storage area 134.

The message storage area 134 is an area for storing messages posted from the terminal device 10 to the server device 20, and messages acquired from the server device 20. FIG. 3 is a table showing a data configuration of a message in the present embodiment. As shown in FIG. 3, a posting source user ID (for example, "User1") for identifying a user who posts a message, a posting destination user ID (for example, "MFP1") for identifying a user to which the message is posted, a posting date and time (for example, "2019/01/28 10:00:01") indicating a date and time when the message is posted, and a posted content input by the user (for example, "I want to print") are stored in the message.

The posting source user ID and the posting destination user ID are information allowing for unique identification of a user utilizing the message transmitting/receiving function. For example, the information may be an account name or a user name decided by a user, or a serial number or a random character string decided by the server device 20.

As for an image message, the posted content may include image data itself, or as shown in D100 of FIG. 3, the posted content may include information indicating a location of the image data.

The image data storage area 136 is an area for storing image data. Image data stored in the image data storage area 136 is, for example, image data acquired based on a posted content of an image message. The image data stored in the image data storage area 136 may be image data received from an external device via the communicator 140, image data captured by an image input device such as a camera included in the terminal device 10, and image data generated by the terminal device 10.

The communicator 140 is a functional element used by the terminal device 10 to communicate with an external device such as the server device 20. For example, the communicator 140 includes a network interface card (NIC) used in a wireless LAN, and a communication module connectable to an LTE/LTE-Advanced (LTE-A)/License-Assisted Access (LAA) using LTE/5G line.

1.2.2 Server Device

Figure 4:
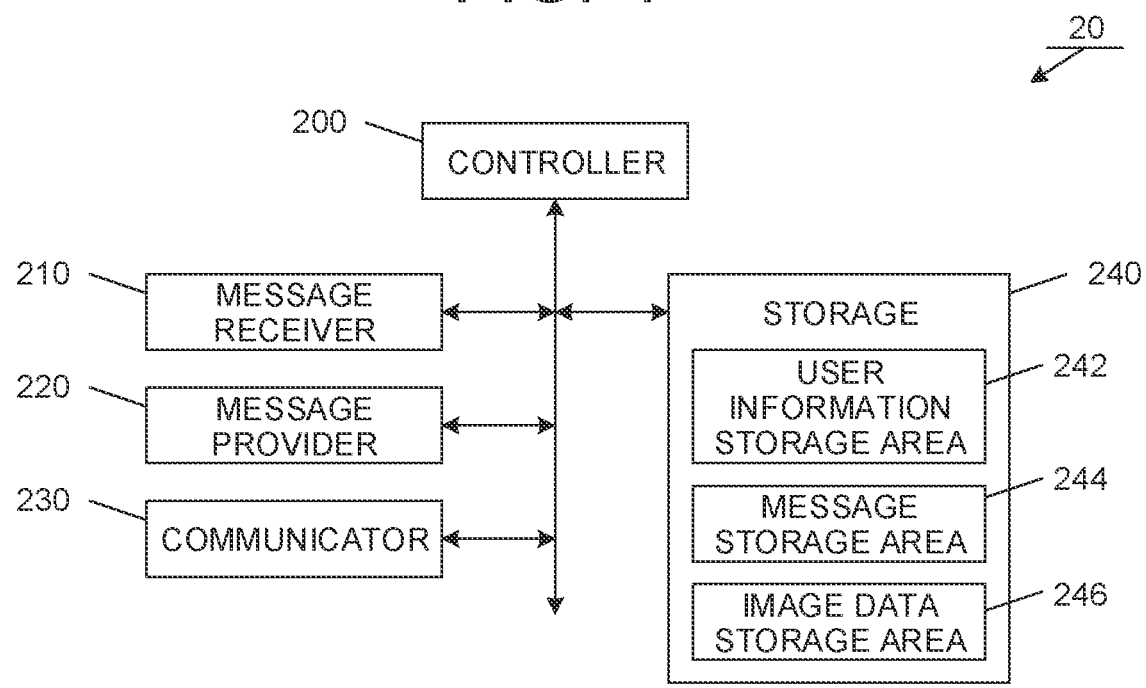
FIG. 4 is a diagram for describing a functional configuration of a server device according to the first embodiment.

A functional configuration of the server device 20 will be described with reference to FIG. 4. As illustrated in FIG. 4, the server device 20 includes a controller 200, a message receiver 210, a message provider 220, a communicator 230, and a storage 240.

The controller 200 is a functional element that controls the entire server device 20. The controller 200 realizes various types of functions by reading and executing various types of programs, and includes, for example, one or more central processing units (CPUs).

The message receiver 2110 is a functional element that receives messages posted from an external device via the communicator 230, and stores the messages in a message storage area 244. Upon receiving an image message, the message receiver 210 acquires image data based on information indicating an image included in a posted content of the message, and stores the image data in an image data storage area 246. If a message is posted, the message receiver 210 may transmit a notification, to a device used by a user identified by the posting destination user ID, indicating that a message is posted.

Upon receiving the message, the message receiver 210 may determine whether information about the user who posts the message is stored in a user information storage area 242. In this case, if the information about the user who posts the message is stored in the user information storage area 242, the message receiver 210 determines that the message is posted by a legitimate user of the message transmitting/receiving function to accept the posting. On the other hand, if the information about the user who posts the message is not stored in the user information storage area 242, the message receiver 210 may reject the posting, or may transmit information about an error to the device who posts the message. In this way, the message receiver 210 can authenticate a user when a message is posted.

The message provider 220 is a functional element that provides (transmits), if there is a request for provision of a message from a device using the message transmitting/receiving function, messages stored in the message storage area 244, in a chronological order, to the device that requests for the provision of the message.

Upon being requested for the provision of the message, the message provider 220 may authenticate a user, similarly to the message receiver 210, based on whether information about a user requesting for the provision of the message is stored in the user information storage area 242.

The communicator 230 is a functional element used by the server device 20 to communicate with an external device. For example, the communicator 230 includes an NIC utilized in a wired/wireless LAN.

The storage 240 is a functional element that stores various types of programs and various types of data necessary for an operation of the server device 20. The storage 240 includes, for example, an SSD being a semiconductor memory, and an HDD.

The storage 240 secures the user information storage area 242, the message storage area 244, and the image data storage area 246.

The user information storage area 242 is an area for storing information about users using the message transmitting/receiving function. Examples of information about users to be stored include information necessary for authenticating a user such as a user ID, a user name, and a password, and information such as an access token used when transmitting a notification regarding the posting of a message to the user.

The message storage area 244 is an area for storing messages posted from a device using the message transmitting/receiving function. The image data storage area 246 is an area for storing image data based on information indicating an image included in the posted content of an image message.

1.2.3 Image Forming Apparatus

Figure 5:
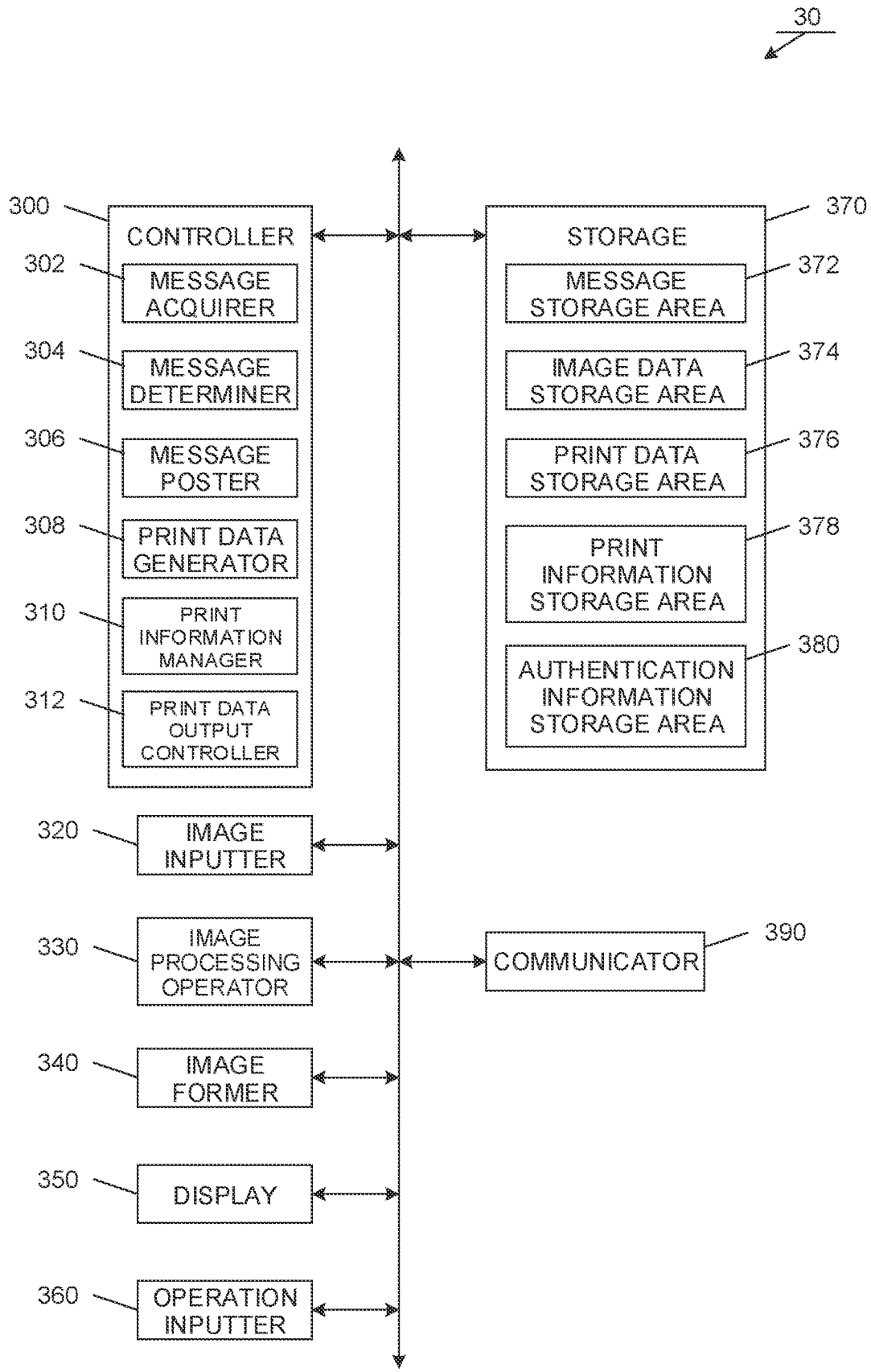
FIG. 5 is a diagram for describing a functional configuration of an image forming apparatus according to the first embodiment.

A functional configuration of the image forming apparatus 30 will be described with reference to FIG. 5. As illustrated in FIG. 5, the image forming apparatus 30 includes a controller 300, an image inputter 320, an image processing operator 330, an image former 340, a display 350, an operation inputter 360, a storage 370, and a communicator 390.

The controller 300 is a functional element that controls the entire image forming apparatus 30. The controller 300 realizes various types of functions by reading and executing various types of programs, and includes, for example, one or more central processing units (CPUs).

Further, by reading and running the software (program) stored in the storage 370, the controller 300 functions as a message acquirer 302, a message determiner 304, a message poster 306, a print data generator 308, a print information manager 310, and a print data output controller 312.

The message acquirer 302 requests the server device 20 to provide messages either on a regular basis or upon receiving a notification transmitted from the server device 20, acquires the messages provided by the server device 20, and stores the messages in a message storage area 372. Upon acquiring an image message, the message acquirer 302 acquires the image data stored in the image data storage area 246 of the server device 20, based on the information indicating the image, and stores the image data in an image data storage area 374.

The message determiner 304 determines a type of message (a text message or an image message), and whether the message contains a predetermined content. For example, the message determiner 304 makes the following determination regarding the content included in the acquired message:
(1) Whether a print request phrase is included
(2) Whether a print execution phrase is included
(3) Whether an output condition is included The print request phrase is a phrase indicating that generation of print data is requested (for example, "I want to print"). The print execution phrase is a posted content of a text message posted by the user when requesting the output of print data.

The output condition is a condition (setting) for outputting an image based on the print data. The output condition is, for example, a size of a recording sheet (for example, "A4" or "B5"), a color mode (for example, "color" or "black and white"), or a type of a recording sheet (for example, "plain paper print" or "photograph print").

The message poster 306 generates messages and posts the generated messages to the server device 20. For example, if generating a text message, the message poster 306 generates text data by a predetermined method, and generates a message with the generated text data as the posted content. The method of generating text data includes, for example, a method of selecting an appropriate sentence from fixed sentences stored in advance, a method of embedding predetermined information in a template stored in advance, a method of automatically generating text data using a learned model, or the like.

The print data generator 308 generates print data, based on the message acquired by the message acquirer 302, and stores the print data into a print data storage area 376. For example, the print data generator 308 executes a process, based on the content of the message including the output condition, on the image data acquired based on the content of the image message, and generates print data that enables the output of image data after the execution of the process.

The print information manager 310 stores information (print information) related to print data into a print information storage area 378.

The print data output controller 312 performs control to output print data from the image former 340. The print data output controller 312 controls the display 350 to display a screen related to the output of print data.

The message acquirer 302, the message determiner 304, the message poster 306, the print data generator 308, the print information manager 310, and the print data output controller 312 may be realized by hardware, through partial or complete individual chipping.

The image inputter 320 is a functional element that reads a document input to the image forming apparatus 30, and generates image data. For example, the image inputter 320 is connected to a document reading device (for example, a scanner) to generate image data based on the document input from the document reading device.

The image processing operator 330 is a functional element that performs various types of image processes on image data. For example, the image processing operator 330 performs a sharpening process or a color conversion process on image data.

The image former 340 is a functional element that forms an image based on print data stored in the print data storage area 376 onto a recording medium (for example, a recording sheet). The image former 340 includes, for example, a laser printer or the like utilizing an electrophotographic method.

The display 350 is a functional element that displays various types of information to the user. For example, the display 350 includes an LCD and an organic electro-luminescence (electro-luminescence) panel. The operation inputter 360 is a functional element on which a user performs various types of operations. For example, the operation inputter 360 is configured by a touch panel overlaid and provided on the display 350. Touch detection through the touch panel is realized by a well-known technique including an electrostatic induction method and a pressure-sensitive method. The operation inputter 360 may be a physical button, may include a touch panel and a physical button, or may be only the touch panel.

The storage 370 is a functional element that stores various types of programs and various types of data necessary for operating the image forming apparatus 30. For example, the storage 370 includes an SSD Being a semiconductor memory, and an HDD.

The storage 370 secures the message storage area 372, the image data storage area 374, the print data storage area 376, the print information storage area 378, and an authentication information storage area 380.

The message storage area 372 is an area for storing messages acquired from the server device 20. The image data storage area 374 is an area for storing image data acquired from the server device 20 and image data generated by the image inputter 320.

The print data storage area 376 is an area for storing print data. In the present embodiment, the print data identified by a print data name will be described.

The print data is generated, based on a message acquired from the server device 20, or is transmitted from a server providing a net print service connected via the communicator 390. The print data generation process of generating print data, based on the message acquired from the server device 20 will be described in the process flow described later.

The print information storage area 378 is an area for storing print information. FIG. 6 is a table showing a data configuration of output information according to the present embodiment. As shown in FIG. 6, a print information ID (for example, "0001") for identifying print information, a print data name (for example, "0001.jpg"), a posting source user ID (for example, "User1") that identifies a user posting an image message based on which print data is generated, a print data output condition, and a print execution phrase (for example, "This is Ogino. Please execute printing.") is stored in the print information.

As shown in FIG. 6, for example, a sheet size of a recording sheet (for example, "A4"), a color mode for output (for example, "color"), a sheet mode indicating a type of a recording sheet (for example, "photograph"), simplex/duplex printing indicating the side of the recording sheet to be output (for example, "simplex printing"), and the number of copies to be output (for example, "1") are stored in the output condition. The output condition may be some of the above items, or may include items other than the above items.

The authentication information storage area 380 is an area for storing information for authenticating a user of a net print service (authentication information). For example, a user name and a password of a user of a net print service, and a print data name that identifies print data outputtable by the user are stored. The information about a user name and a password of the net print service is stored, for example, based on data transmitted from a server providing the net print service.

The communicator 390 is a functional element used by the image forming apparatus 30 to communicate with an external device. For example, the communicator 390 includes an NIC used in a wired/wireless LAN, or a communication module connectable to an LTE/LTE-A/LAA/5G line.

1.3 Process Flow

Subsequently, a main process in which the controller 300 reads a program from the storage 370 and executes the program will be described. The main process is executed if the message acquirer 302 of the image forming apparatus 30 acquires a message, from the server device 20, with the image forming apparatus 30 as the posting destination.

In the description of the process flow, the image forming apparatus 30 will be described on the assumption that the image forming apparatus 30 transmits and receives messages to and from one user using the message transmitting/receiving function. Therefore, if executing the process of posting a message, the image forming apparatus 30 executes a process of generating a message to be posted to one user using the message transmitting/receiving function, and transmitting the message to the server device 20.

Figure 7:
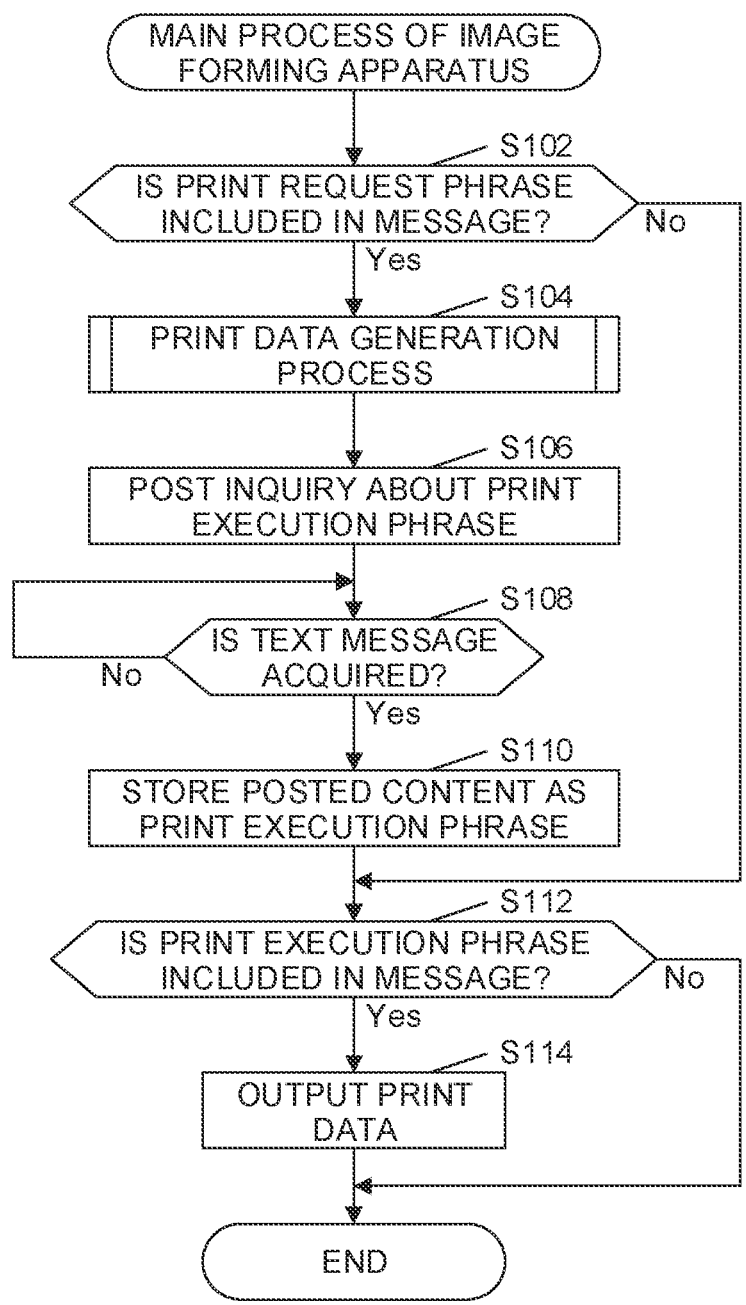
FIG. 7 is a flowchart for describing a flow of a main process of the image forming apparatus according to the first embodiment.

The flow of the main process will be described with reference to FIG. 7. Firstly, the message determiner 304 determines whether a print request phrase is included in a message acquired from the server device 20 by the message acquirer 302 (step S102).

Figure 8:
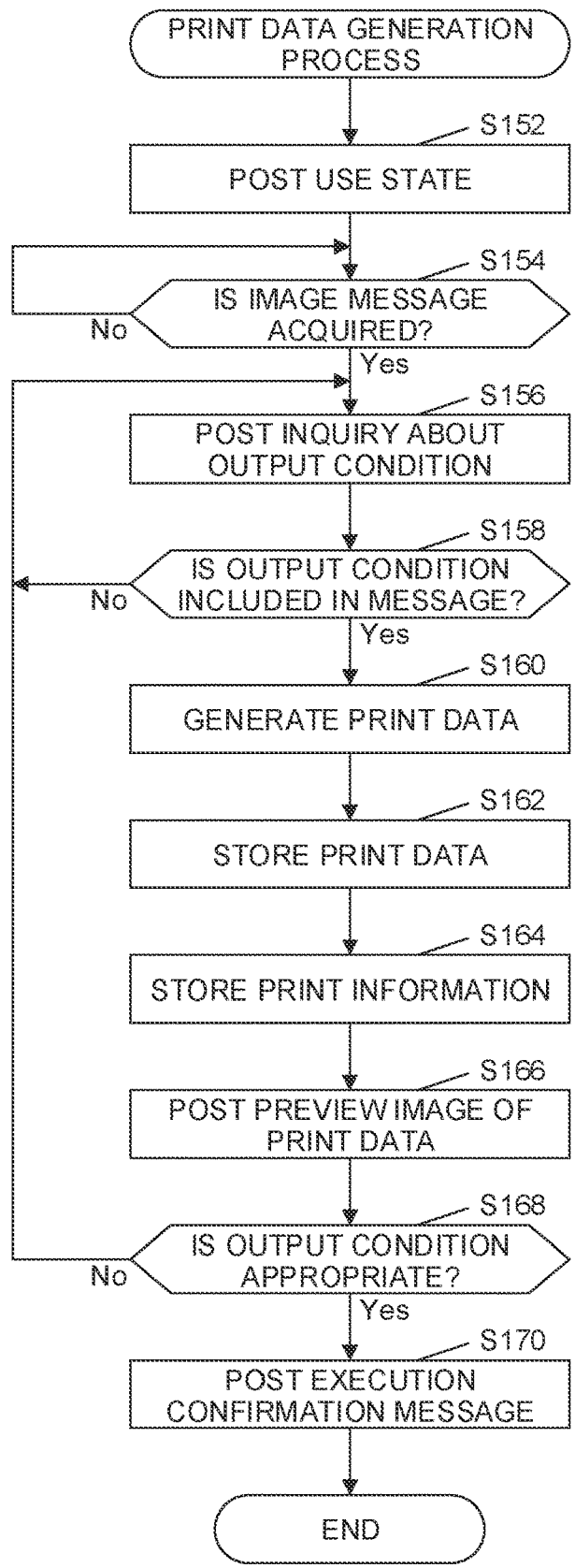
FIG. 8 is a flowchart for describing a flow of a print data generation process according to the first embodiment.

If a print request phrase is included in the acquired message, the controller 300 executes a print data generation process of generating print data, based on the message posted by the user (step S102, Yes→step S104). The print data generation process will be described with reference to FIG. 8.

Firstly, the message poster 306 posts a use state of the image forming apparatus 30 (step S152). The use state is information indicating how the image forming apparatus 30 is being used, the information includes information as to whether the image forming apparatus 30 is in operation, and information such as the number of print data stored in the print data storage area 376, and the number of people in the vicinity of the image forming apparatus 30.

Subsequently, the message determiner 304 determines whether an image message is acquired (step S154). If an image message is not acquired, the message poster 306 may post a message with a content prompting to post an image message as the posted content (step S154, No). If an image message is acquired, the image data of the image posted as a message is stored into the image data storage area 374 by a process of the message acquirer 302.

If an image message is acquired, the message poster 306 posts a message inquiring about the output condition (step S154, Yes→step S156). If a message is acquired by the message acquirer 302 after the message inquiring about the output condition is posted, the message determiner 304 determines whether the output condition is included in the content of the acquired message (step S158). For example, if a character string or information such as "A4" or "B5" is included in the posted content of a message, the message determiner 304 determines that the output condition is included in the message.

If the output condition is included in the message, the print data generator 308 generates print data (step S158, Yes→step S160). Specifically, the print data generator 308 generates print data for printing the image data obtained by executing a process based on the output condition included in the message acquired in step S158 on image data acquired in step S154.

For example, if a message in which a character string indicating a sheet size as the output condition is included in the posted content is acquired, the print data generator 308 generates print data for image data obtained by scaling image data to the size of the sheet size indicated in the posted content. If a message in which the output condition of the color mode is set to "monochrome" is acquired, the print data generator 308 generates print data for image data obtained by converting image data into a binary image or a grayscale image. The image processing on the image data may be executed by the image processing operator 330.

If an output condition is not included in the message, the processing returns to step S156, and the message poster 306 again posts a message inquiring about the output condition (step S158, No→step S156).

Subsequently, the print data generator 308 stores the print data generated in step S160 into the print data storage area 376 (step S162). At this time, the print data generator 308 sets an appropriate print data name (for example, a serial number or the like) to the print data to be stored.

Subsequently, the print information manager 310 stores the print information about the print data stored in step S162 into the print information storage area 378 (step S164). Specifically, the print information manager 310 stores print information containing the print data name set in step S162, the posting source user ID of the message acquired in step S154, and the output setting included in the message acquired in step S158, into the print information storage area 378.

Subsequently, the message poster 306 posts an image message with the preview image of the print data generated in step S160 as the posted content (step S166).

Subsequently, the print information manager 310 determines whether the output condition is appropriate or not (step S168). A case where the output condition is appropriate is a case where it is possible to form the print data based on the output condition included in the message posted by the user as an image on a recording medium by the image former 340. For example, the print information manager 310 reads the print information stored in step S164 and determines whether an essential output condition is not missing, and whether an inappropriate output condition is not stored. If an inappropriate output condition is stored or an essential output condition is missing, the print information manager 310 determines that the output condition is not appropriate.

If the output condition is not appropriate, the processing returns to step S156 (step S168, No→step S156). At this time, the message poster 306 posts a message inquiring about the essential output conditions and inappropriate output conditions in step S156.

If it is determined by the message determiner 304 that the output condition is included in the acquired message, the print data generator 308 and the print information manager 310 reflect the output condition in the already stored print data and print formation. For example, in step S160, the print data generator 308 generates print data obtained by applying the output condition included in the newly acquired message to the print data stored in the print data storage area 376 when the step S162 is executed the first time. In step S164, the print information manager 310 stores the output condition included in the newly acquired message for the print information stored in the print information storage area 378 when the step S164 is executed the first time. The print data and print information are updated by repeating the above-described process until the print information manager 310 determines that the output condition is appropriate.

If the print information manager 310 determines in step S168 that the output condition is appropriate, the message poster 306 posts an execution confirmation message (step S168, Yes→step S170). The execution confirmation message is a message including information about a cost charged to the user when output of the print data is executed, and a time required for the output. By confirming the execution confirmation message, the user can know that it is possible to print the image data posted to the image forming apparatus 30.

Returning to FIG. 7, the message poster 306 posts a message inquiring about the print execution phrase (step S106).

After the processing of step S106, the message determiner 304 determines whether the message acquired by the message acquirer 302 is a text message (step S108). If the message is a text message, the print information manager 310 stores the text data being the posted content as the print execution phrase into the print information stored in step S164 (step S108, Yes→step S110). Thus, the print information manager 310 uses the character string (text data) decided by the user as the print execution phrase, based on the message posted by the user. That is, the user can decide the print execution phrase by himself/herself.

Subsequently, the message determiner 304 determines whether a print execution phrase is included in the message acquired by the message acquirer 302 (step S112). A case where a print execution phrase is included, for example, the case where all of the following conditions are satisfied:
(1) The acquired message is a text message.
(2) The posted content is stored as any one of the print execution phrases in the print information.
(3) The posting source user ID of the message and the posting source user ID of the print information are matching.

Specifically, the message determiner 304 determines whether the acquired message is a text message. If the acquired message is a text message, the message determiner 304 searches the print information storage area 378 for print information in which the same text data as the posted content of the acquired text message is stored as a print execution phrase. If one or more items of print information is acquired as a result of the search, the message determiner 304 searches for the print information in which the posting source user ID stored in the print information matches the posting source user ID that posts the text message, from the acquired print information. If one or more items of print information is acquired as a result of the search, the message determiner 304 determines that the print execution phrase is included in the message.

If the print execution phrase is included in the message, the print data output controller 312 outputs print data identified by a print data name of print information in which the print execution phrase included in the message is stored, via the image former 340 (step S112, Yes→step S114).

If there are a plurality of pieces of print information in which the print execution phrase included in the message is stored, the print data output controller 312 may sequentially read the plurality of print information and output the print data, or may execute outputting the print data selected by the user.

1.4 Operation Example

An operation example of the present embodiment will be described with reference to FIG. 9A and FIG. 9B. FIG. 9A is a display example of a screen W100 displayed on the display 110 of the terminal device 10 if the print data generation process is being executed.

The screen W100 includes an area E100 for displaying a timeline. In FIG. 9A, a content of a message posted by a user is displayed on the right side in the area E100, and a content of a message which is posted by the message poster 306 of the image forming apparatus 30 and in which the user is the posting destination is displayed on the left side in the area E100.

The screen W100 includes an area E102 for displaying information about a posting destination user. FIG. 9A illustrates a case where the user ID of the posting destination is displayed in the area E102. By checking the area E102, a user knows a user at a posting destination of a message.

As indicated in a message M100 of FIG. 9A, if the user posts an image message of an image desired to be printed, the image posted as the message is displayed on the timeline. At this time, the image data of the image message posted by the user is transmitted to the server device 20 and acquired by the image forming apparatus 30.

As indicated in a message M102 of FIG. 9A, the user posts a message including an output condition (for example, the message M102 is "photo print" indicating a type of recording sheet). At this time, the image forming apparatus 30 generates print data, based on the output condition included in the message, and posts an image message with a preview image as the posted content, or an execution confirmation message.

FIG. 9B is a display example of a screen W110 displayed on the display 110 of the terminal device 10 after the execution of the print data generation process is complete. As indicated in a message M110 of FIG. 9B, the user posts a text message in response to an inquiry about the print execution phrase from the image forming apparatus 30. The image forming apparatus 30 stores the posted content included in the text message posted by the user (in the example of the message M110, "This is Ogino. Please execute printing.") as a printing execution phrase. As indicated in a message M112 of FIG. 9B, the image forming apparatus 30 posts that a print execution phrase is received.

Thereafter, as indicated in a message M114 of FIG. 9B, the user posts a message including the print execution phrase. As a result, the image forming apparatus 30 executes outputting the print data of the image indicated in the message M100 of FIG. 9A.

Some users may post a print execution phrase some time after the print execution phrase is decided. Therefore, there may be a certain time difference (for example, three hours) between a timing when the print execution phrase is decided (when the message M110 is posted) and a timing when the print execution phrase is posted (when the message M114 is posted). That is, after executing a print data generation process by posting a message to the image forming apparatus 30, a user may output the generated print data from the image forming apparatus 30 at any timing. Therefore, for example, the user may execute the print data generation process at home or away from home, and outputting the print data when visiting a place (such as a store) where the image forming apparatus 30 is installed.

According to the present embodiment, it is possible to perform execution of generating print data and outputting print data only through a simple operation of posting a message with the image forming apparatus as a posting destination. Therefore, as compared with a case of using a net print service, an operation of entering a user name and a password to the image forming apparatus is eliminated, and thus, it is possible to omit a procedure and a time for executing printing.

The user is authenticated by the server device providing the message transmitting/receiving function, and thus, in the image forming apparatus according to the present embodiment, it is possible to omit the process of authenticating the user during output of print data. Further, the image forming apparatus according to the present embodiment executes outputting print data when a print execution phrase decided by the user, that is, a print execution phrase known only to the user, is posted. Therefore, it is possible to reduce a possibility of outputting print data by a person other than the user who executes the print data generation process to ensure security during the output of print data.

2. Second Embodiment

Next, a second embodiment will be described. The second embodiment is an embodiment in which output of print data is suspended if a user is not in the vicinity of the image forming apparatus 30 even if a posting by the user includes a print execution phrase. In the present embodiment, FIG. 7 in the first embodiment is replaced with FIG. 10. It is noted that the same numeral or symbol is attached to the same functional element and process, and description thereof is omitted.

Figure 10:
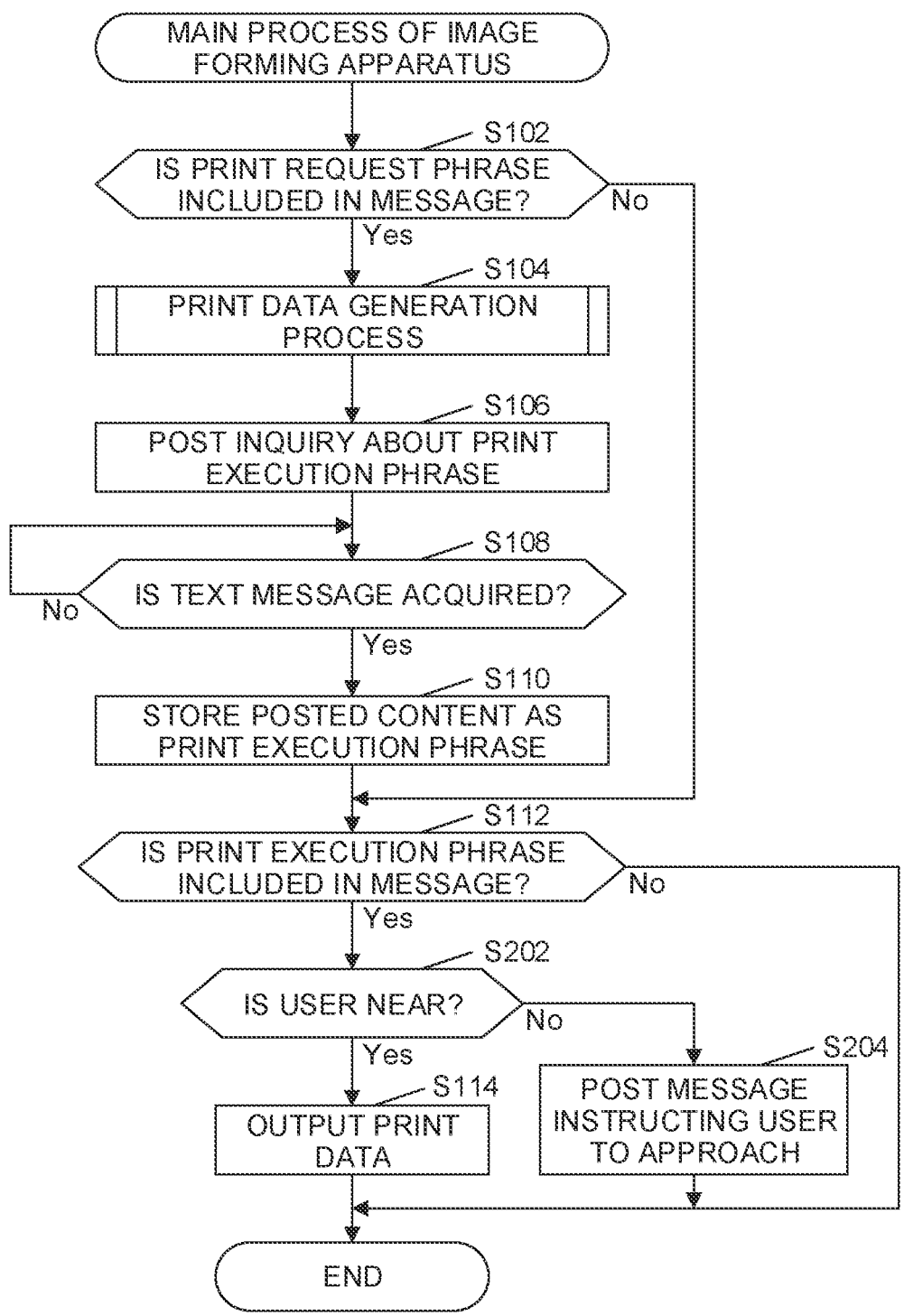
FIG. 10 is a flowchart for describing a flow of a main process of the image forming apparatus according to a second embodiment.

A main process of the image forming apparatus 30 according to the present embodiment will be described with reference to FIG. 10. In the present embodiment, after a message containing a print execution phrase is posted, the print data output controller 312 determines whether a user posting the print execution phrase is in the vicinity of the image forming apparatus 30 (step S202).

Examples of a method of determining whether the user posting the print execution phrase is in the vicinity of the image forming apparatus 30 include the following methods.

(1) Method of Connecting the Terminal Device 10 and the Image Forming Apparatus 30 by a Wireless LAN For example, the image forming apparatus 30 is provided with a function as a wireless LAN access point. In addition, the storage 130 of the terminal device 10 stores information for the user to connect to the access point provided by the image forming apparatus 30 (for example, a service set identifier (SSID), a password, and setting information required for connecting), or an application for connection in which the user ID of the message transmitting/receiving function is stored.

When the user causes the image forming apparatus 30 to output print data, the user starts the application for connection, and the terminal device 10 is connected to the image forming apparatus 30 using the wireless LAN to transmit the user ID of the message transmitting/receiving function. The print data output controller 312 determines that the user is in the vicinity of the image forming apparatus 30 if the user ID transmitted from the terminal device 10 connected by the wireless LAN matches the posting source user ID stored in the print information related to the print data to be output.

(2) Method Using Bluetooth

A beacon that transmits a signal in accordance with the Bluetooth standard is installed near the image forming apparatus 30. The image forming apparatus 30 stores beacon information in advance and is communicable with a position management server that manages a position of the terminal device 10. The position management server stores the information about the image forming apparatus 30 installed near the beacon and the information about the beacon.

Upon receiving the signal from the beacon, the terminal device 10 transmits the received beacon information and the user ID of the message transmitting/receiving function to the position management server. The position management server transmits the user ID to the image forming apparatus 30 corresponding to the beacon information. The print data output controller 312 determines that the user is in the vicinity of the image forming apparatus 30 if the user ID transmitted from the position management server matches the posting source user ID stored in the print information related to the print data to be output.

(3) Method Using Position Information

The image forming apparatus 30 is communicable with a position management server that manages the position of the terminal device 10. The position management server stores information about the image forming apparatus 30 and information about a position where the image forming apparatus 30 is installed (for example, the latitude and longitude).

The terminal device 10 transmits the information about the position of the terminal device 10 (for example, the latitude and longitude) and the user ID of the message transmitting/receiving function to the position management server at a timing when a predetermined operation is performed by the user or at a predetermined timing. The position management server identifies the position of the terminal device 10, based on the position information received from the terminal device 10, and transmits the user ID to the image forming apparatus 30 within a predetermined range from the identified position. The print data output controller 312 determines that the user is in the vicinity of the image forming apparatus 30 if the user ID transmitted from the position management server matches the posting source user ID stored in the print information related to the print data to be output.

(4) Method of Bringing the Terminal Device 10 in Close Proximity to the Image Forming Apparatus 30

For example, the terminal device 10 and the image forming apparatus 30 are connected by using the technique of short-range radio communication, and the image forming apparatus 30 acquires the user ID of the message transmitting/receiving function transmitted from the terminal device 10. Alternatively, a one-dimensional code or a two-dimensional code indicating the user ID of the message transmitting/receiving function is displayed on the display 110 of the terminal device 10, and the image forming apparatus 30 reads the code to acquire the user ID of the message transmitting/receiving function. The print data output controller 312 determines that the user is in the vicinity of the image forming apparatus 30 if the user ID acquired from the terminal device 10 matches the posting source user ID stored in the print information related to the print data to be output.

If the user is in the vicinity of the image forming apparatus 30, the print data output controller 312 executes outputting the print data (step S202, Yes→step S114). On the other hand, if the user posting the print execution phrase is not in the vicinity of the image forming apparatus 30, the print data output controller 312 suspends the output of the print data. The message poster 306 posts a message instructing the user to approach (step S202, No→step S204).

Figure 11:
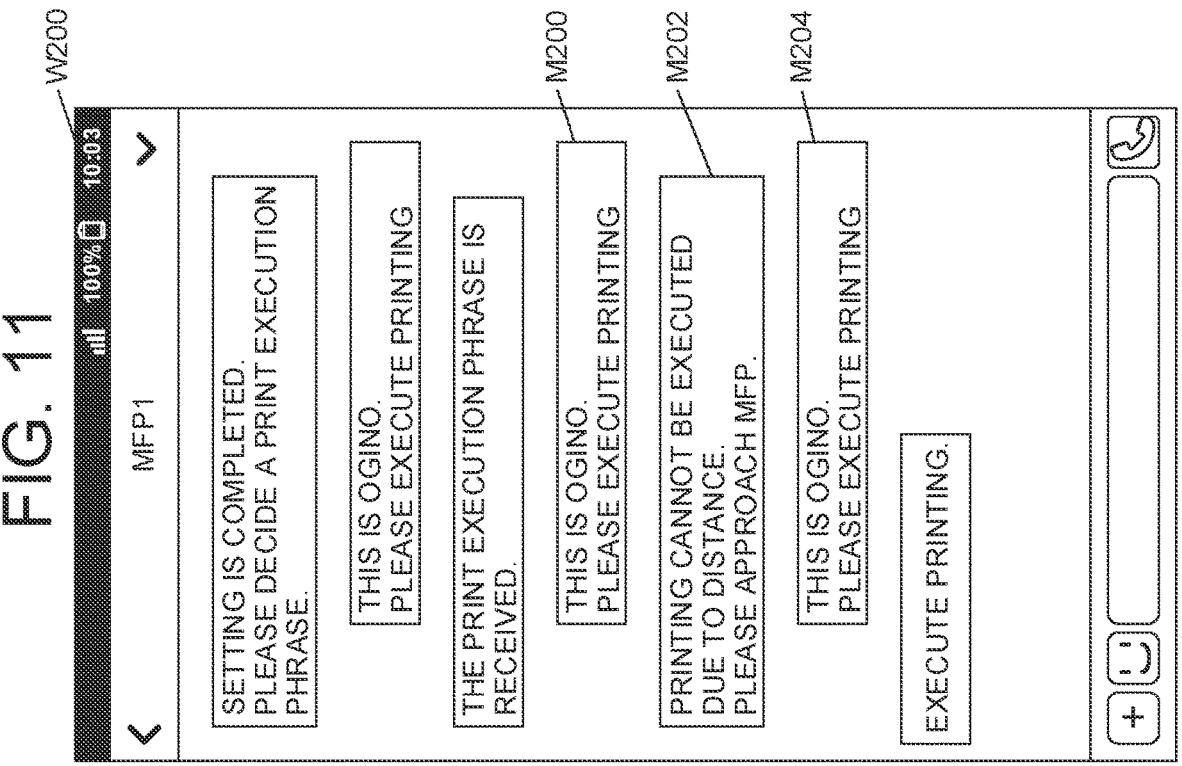
FIG. 11 is a diagram for describing an operation example according to the second embodiment.

An operation example according to the present embodiment will be described with reference to FIG. 11. FIG. 11 is a display example of a screen W200 displayed on the display 110 of the terminal device 10 owned by the user of the image forming apparatus 30. When the user desires to output the print data, the user posts a print execution phrase as indicated in a message M200 of FIG. 11.

At this time, if the user posting the print execution phrase is not in the vicinity of the image forming apparatus 30, a message instructing the user to approach is posted by the image forming apparatus 30 as indicated in a message M202 of FIG. 11. After the user comes closer to the image forming apparatus 30, the user again posts the print execution phrase as indicated in a message M204 of FIG. 11. If the user posting the print execution phrase is in the vicinity of the image forming apparatus 30, the image forming apparatus 30 outputs the print data.

According to the present embodiment, if the user posting the print execution phrase is not in the vicinity of the image forming apparatus, the output of the print data is suspended. Therefore, even if the user posts the print execution phrase due to an erroneous operation or the like at a location away from the image forming apparatus, it is possible to prevent the print data from being output from the image forming apparatus.

3. Third Embodiment

Next, a third embodiment will be described. The third embodiment is an embodiment in which the image forming apparatus 30 accepts an output reservation from the user if it is not possible to execute outputting the print data. In the present embodiment, FIG. 7 in the first embodiment is replaced with FIG. 12. It is noted that the same numeral or symbol is attached to the same functional element and process, and description thereof is omitted.

In the present embodiment, the storage 370 of the image forming apparatus 30 stores a job list including information about the jobs being the process of outputting the print data. The controller 300 of the image forming apparatus 30 reads the information about the job having the highest order of execution from the job list, and executes the job. Once the controller 300 executes the job, the controller 300 deletes the information about the executed job from the job list. Thus, the image forming apparatus 30 executes the jobs in an order, based on the order of execution if there are a plurality of jobs.

Figure 12:
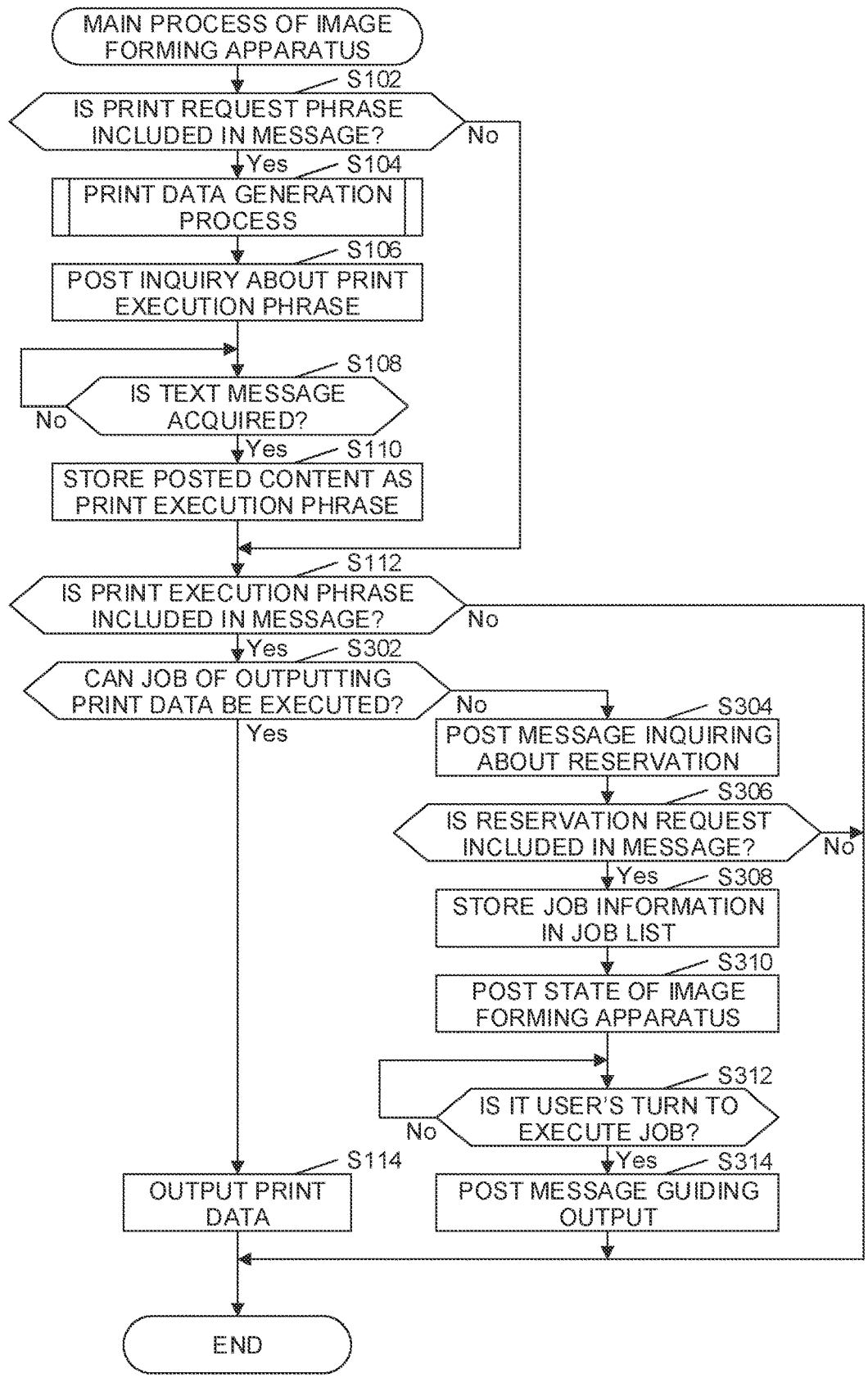
FIG. 12 is a flowchart for describing a flow of a main process of the image forming apparatus according to a third embodiment.

A main process of the image forming apparatus 30 according to the present embodiment will be described with reference to FIG. 12. In the present embodiment, after a message containing the print execution phrase is posted, the print data output controller 312 determines whether the job for outputting the print data can be executed (step S302). Examples of the case where the job for the output of print data is not executable include the following conditions.

(1) A case where the image forming apparatus 30 is in operation
(2) A case where the image forming apparatus 30 is executing another job
(3) A case where the image cannot be formed due to reasons including running out of paper or toner If a job for outputting print data can be executed, the print data output controller 312 outputs the print data by executing the job (step S302, Yes→step S114).

On the other hand, if a job for outputting print data cannot be executed, the message poster 306 posts a message inquiring about the selection of whether to reserve the output of print data (step S302, No→step S304).

Subsequently, the message determiner 304 determines whether a reservation request is included in the message acquired from the server device 20 by the message acquirer 302 (step S306). A reservation request is a character string or information such as "Reserve" or "Yes" indicating a positive response to a reservation inquiry. If a reservation request is included, the print data output controller 312 stores the information about the job related to the output of the print data that could not be executed in step S302 into the job list (step S306, Yes→step S308). Thus, it is possible to suspend the execution of the job for outputting print data if the image forming apparatus 30 is in operation, if the image forming apparatus 30 is executing another job, if paper or toner runs out, or the like.

If the message determiner 304 determines in step S306 that a reservation request is not included, the print data output controller 312 ends the main process without outputting the print data (step S306, No). In this case, the controller 300 deletes the print data and print information generated in the print, data generation process in step S104.

In addition, the message poster 306 may post a message guiding the user to output the print data from an image forming apparatus 30 installed at another place (such as a store). If the user selects to output the print data from an image forming apparatus 30 installed at another place (such as a store), the controller 300 transmits the print data and print information generated in the print data generation process in step S104 to the image forming apparatus 30 installed at the other place (such as a store). In this case, the user executes outputting the print data by posting the print execution phrase to the image forming apparatus 30 installed at the other place (such as a store). In this way, if it is not possible to execute the job for outputting the print data in the image forming apparatus 30 at a certain place (such as a store), the job for outputting the print data may be executed in the image forming apparatus 30 at another place (such as a store).

Subsequently, the message poster 306 posts the state of the image forming apparatus 30, such as the number of reserved people (the number of jobs stored in the job list) and the approximate time until it is possible to execute the job for outputting the print data (step S310). If it is not possible to form an image due to reasons including running out of paper or toner, the message poster 306 may post a reason for not being able to form an image as the state of the image forming apparatus 30, or may post a content requesting to convey the replenishment of paper or the replacement of the toner to a store employee or the like.

When it comes a turn of executing a job based on the information about the jobs stored in step S308, the message poster 306 posts a message guiding the output (step S312, Yes→step S314). Examples of the message guiding the output include a message indicating that it comes the turn, or a message with the posted content with an indication that it is possible to form an image.

After posting the message guiding the output, the controller 300 executes the main process again. At this time, if the print request phrase is not included in the message acquired by the message acquirer 302, the message determiner 304 determines whether the print execution phrase is included (step S102, No→step S112). If it is determined that the print execution phrase is included in the message and the print data is outputtable, the print data output controller 312 executes outputting the print data (step S112, Yes→step S302, Yes→step S114).

An operation example of the present embodiment will be described with reference to FIG. 13A and FIG. 13B. FIG. 13A is a display example of a screen W300 displayed on the display 110 of the terminal device 10 if it is not possible to output the print data.

If it is not possible to output the print data, the image forming apparatus 30 posts a message inquiring about a reservation, as indicated in a message M300 of FIG. 13A. At this time, the image forming apparatus 30 may post a message including a reason why the print data cannot be output.

When the image forming apparatus 30 posts a message inquiring about a reservation, as indicated in an area E300 in FIG. 13A, a button for the user to select ether to reserve printing or to cancel printing may be displayed on the display 110 of the terminal device 10. The user selects the button displayed in the area E300 to post a message including information indicating whether to make a reservation.

Figure 13B:
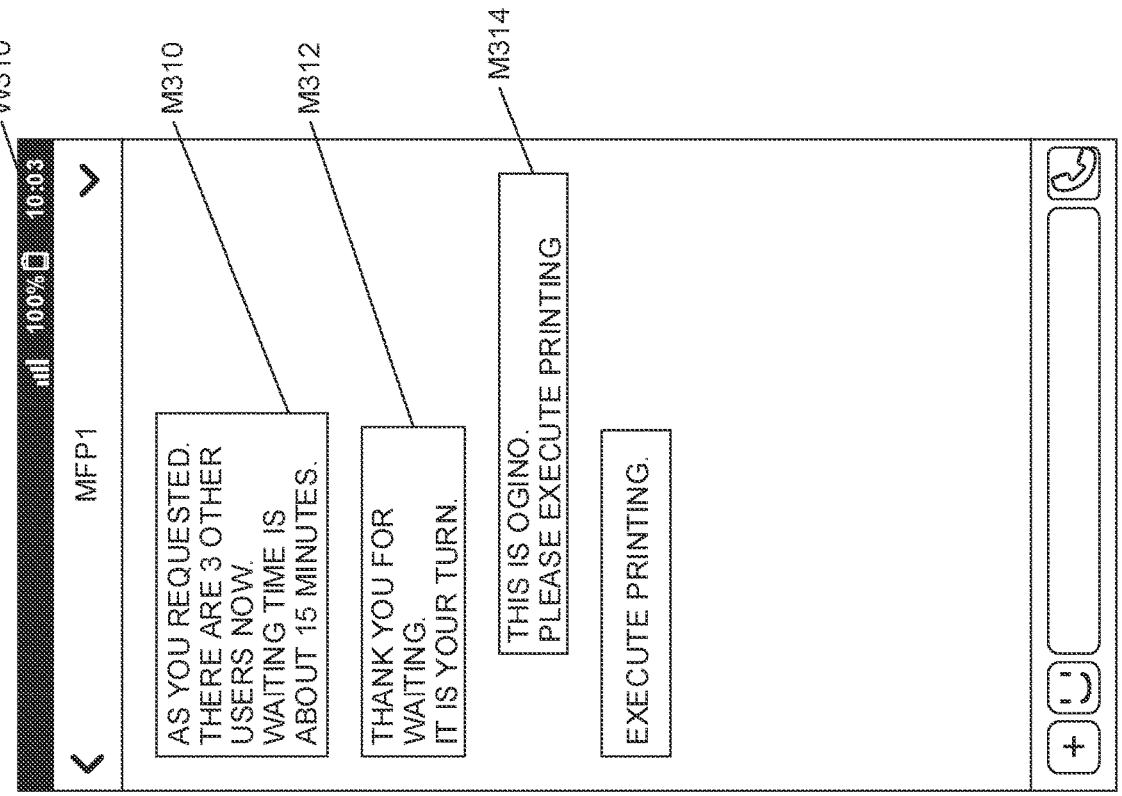
FIG. 13A and FIG. 13B are diagrams for describing an operation example according to the third embodiment.
Figure 13A:
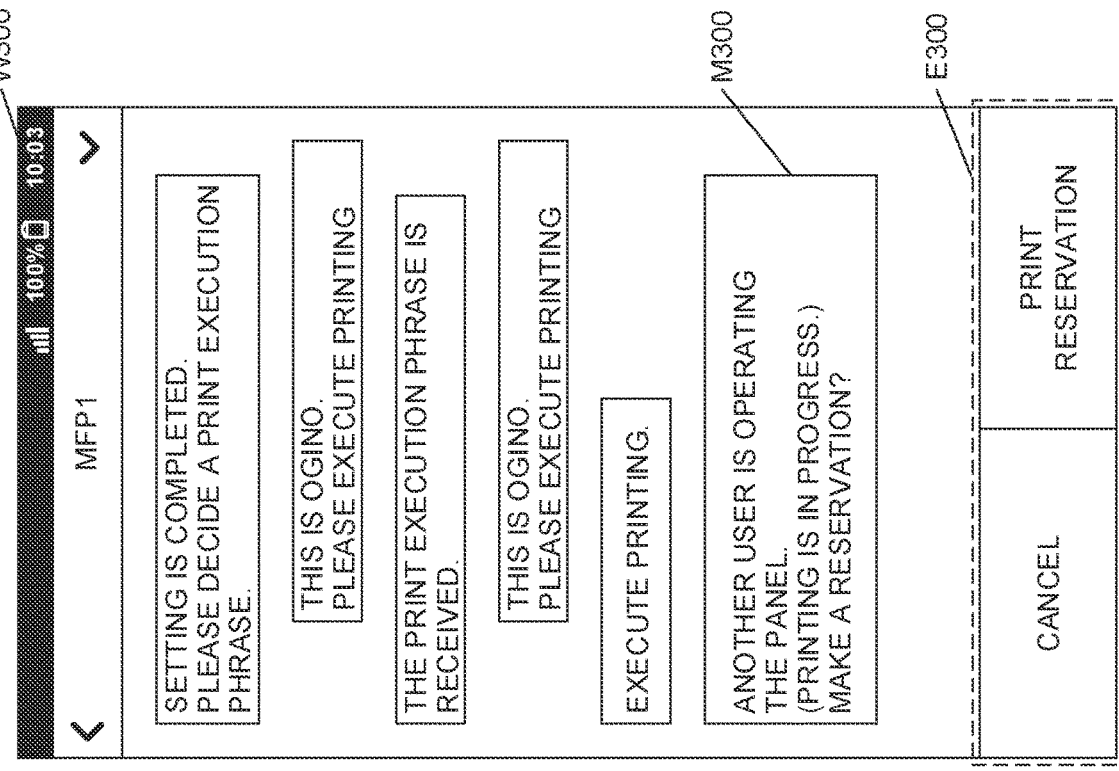

FIG. 13B is a display example of a screen W310 displayed on the display 110 of the terminal device 10 if a print reservation is made. If a print reservation is made, as indicated in a message M310 of FIG. 13B, the image forming apparatus 30 posts the number of people waiting for the reservation, and a time until the print data is output, as the state of the image forming apparatus.

If it is possible to output the print data, the image forming apparatus 30 posts a message guiding the output, as indicated in a message M312 of FIG. 13B. Thereafter, as indicated in a message M314 of FIG. 13B, the user may start outputting the print data by posting an execution confirmation message.

According to the present embodiment, if another user is using the image forming apparatus when a message including the print execution phrase is acquired, the image forming apparatus is capable of suspending the output of print data. Further, when it is possible to output the print data, the image forming apparatus guides the user. Therefore, the image forming apparatus prevents a situation in which users using the image forming apparatus are concentrated and packed. Further, it is not necessary that the user waits in the vicinity of the image forming apparatus until a guidance is posted from the image forming apparatus when it is possible to output the print data, and until it is possible to output the print data.

4. Fourth Embodiment

Next, a fourth embodiment will be described. The fourth embodiment is an embodiment in which the user does not decide the print execution phrase. The present embodiment can be applied to any of the first through third embodiments.

In the present embodiment, in the main process, the controller 300 executes any of the following processes.
(1) The controller 300 decides the print execution phrase.
(2) The controller 300 inquires of the user before executing outputting the print data.

In (1), the controller 300 omits the processing in steps S106 and S108. Instead, the controller 300 decides the print execution phrase. In step S110, the print information manager 310 stores the print execution phrase decided by the controller 300 into the print information. Further, the message poster 306 posts a message notifying the decided print execution phrase.

An example of the method of deciding the print execution phrase may include a method in which the controller 300 sequentially or randomly selects a single character string from one or more predetermined character strings. The controller 300 may decide a character string having a predetermined pattern (for example, a character string obtained by adding a print information ID to a specific character string) as the print execution phrase.

In (2), the controller 300 omits the processing in steps S106 to S110. Before the step S112 is executed, the message poster 306 posts, to the user, contents indicating whether to perform printing, or a message inquiring whether the user is in the vicinity of the image forming apparatus 30. In step S112, the message determiner 304 determines whether a message containing a posted content indicating that printing is to be performed, or a posted content indicating that the user is in the vicinity of the image forming apparatus 30 is posted by the user. If a message containing a posted content indicating that printing is to be performed, or a posted content indicating that the user is in the vicinity of the image forming apparatus 30 is posted, the print data output controller 312 executes outputting the print data. Thus, it is possible to use a character string indicating that printing is to be performed, or a character string indicating that the user is in the vicinity of the image forming apparatus 30 as a print execution phrase.

According to the present embodiment, it is not necessary for the user to decide the print execution phrase, and therefore, the user can use the image forming apparatus 30 more easily.

5. Fifth Embodiment

Next, a fifth embodiment will be described. The fifth embodiment is an embodiment in which, if a print execution phrase is included in a message acquired from the server device 20 by the image forming apparatus 30, a confirmation screen is displayed on the display 350 of the image forming apparatus 30, and the print data is output when the user performs a confirmation operation.

Figure 14:
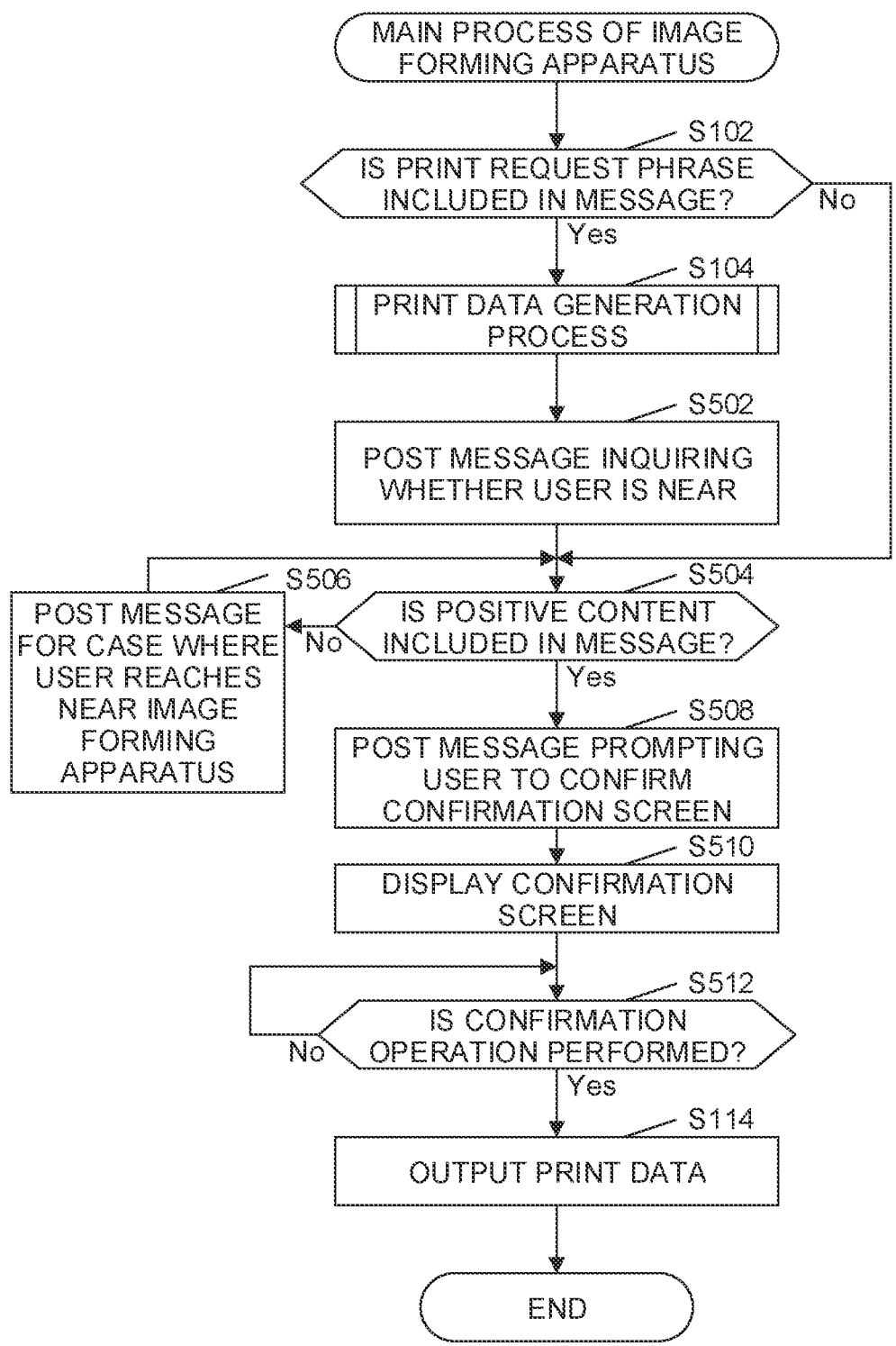
FIG. 14 is a flowchart for describing a flow of a main process of the image forming apparatus according to a fifth embodiment.

The presents embodiment can be applied to any of the first through fourth embodiments, but a case where the present embodiment is applied to the fourth embodiment will be described with reference to FIG. 14.

In the present embodiment, after executing the print data generation process, the message poster 306 posts a message to the user inquiring whether the user is near the image forming apparatus 30 (step S502). Subsequently, the message determiner 304 determines whether the message contains a positive content, that is, whether a message with content indicating that the user is near the image forming apparatus 30 is acquired (step S504).

If the message contains a positive content, the message poster 306 posts a message prompting the user to confirm the confirmation screen displayed on the display 350 (step S504, Yes→step S508). The confirmation screen is a screen for asking the user to confirm whether to output the print data. The print data output controller 312 displays a confirmation screen on the display 350 (step S510). In this way, the controller 300 is capable of making a user near the image forming apparatus 30 confirm the confirmation screen.

Subsequently, the print data output controller 312 outputs the print data if the confirmation operation is performed by the user (step S512, Yes →step S114). The confirmation operation is an operation indicating that the content displayed on the confirmation screen is confirmed, and is a predetermined operation input by the user via the operation inputter 360. For example, the confirmation operation is an operation of touching the place indicated on the confirmation screen if the operation inputter 360 is a touch panel, and an operation in which the user presses a button instructed on the confirmation screen if the operation inputter 360 is a physical button.

If it is determined in step S504 that the message does not contain a positive content, the message poster 306 posts a message for a case where the user reaches near the image forming apparatus 30 (step S504, No→step S506).

As a result of the above-described processing, the controller 300 causes the user to perform a confirmation operation via the operation inputter 360 before outputting the print data, and executes outputting the print data if the user performs the confirmation operation. Thus, instead of outputting the print data immediately after the message containing the print execution phrase is posted by the user, the controller 300 executes outputting the print data after the user performs the confirmation operation. Therefore, even if the user mistakenly posts the print execution phrase, the image forming apparatus 30 is capable of preventing the output of the print data. When the confirmation operation is input by the user via the operation inputter 360, the image forming apparatus 30 executes outputting the print data while the user is in the vicinity of the image forming apparatus 30.

If the present embodiment is applied to from the first embodiment through the third embodiment, the controller 300 may execute the processing of steps S508 and S510 after executing the processing of step S112 in the main process.

An operation example of the present embodiment will be described with reference to the figures. FIG. 15A is a display example of a screen W500 displayed on the display 110 of the terminal device 10 owned by a user of the image forming apparatus 30. After the print data generation process is completed, as indicated in a message M500, a message inquiring whether the user is near the image forming apparatus 30 is posted from the image forming apparatus 30. As indicated in a message M502, if a message containing a positive content is posted by the user, a message prompting the user to confirm the confirmation screen displayed on the display 350 of the image forming apparatus 30 is posted from the image forming apparatus 30. For example, as indicated in a message M504 of FIG. 15A, a text message with the content "Please touch the "Start Printing" button on the screen of the multifunction peripheral." is posted.

Figure 15B:
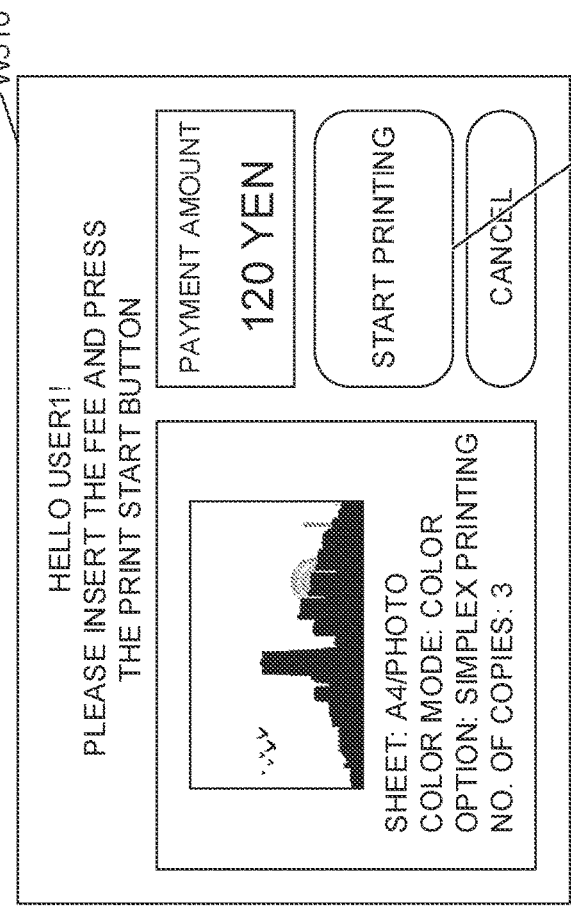
FIG. 15A and FIG. 15B are diagrams for describing an operation example according to the fifth embodiment.
Figure 15A:
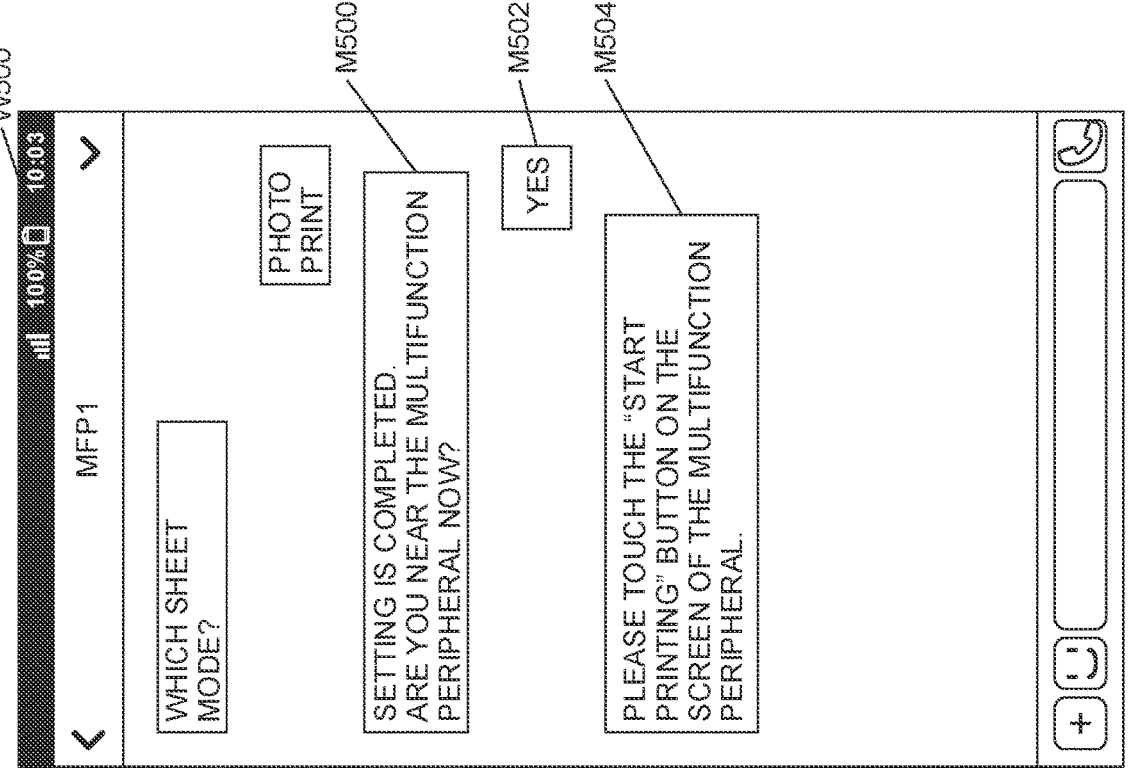

FIG. 15B is a display example of a confirmation screen W510. On the confirmation screen displayed on the display 350, for example, as indicated by a button B510, a button for starting printing is displayed. When the user performs a confirmation operation of touching the button to start printing, the image forming apparatus 30 outputs the print data.

Figure 16A:
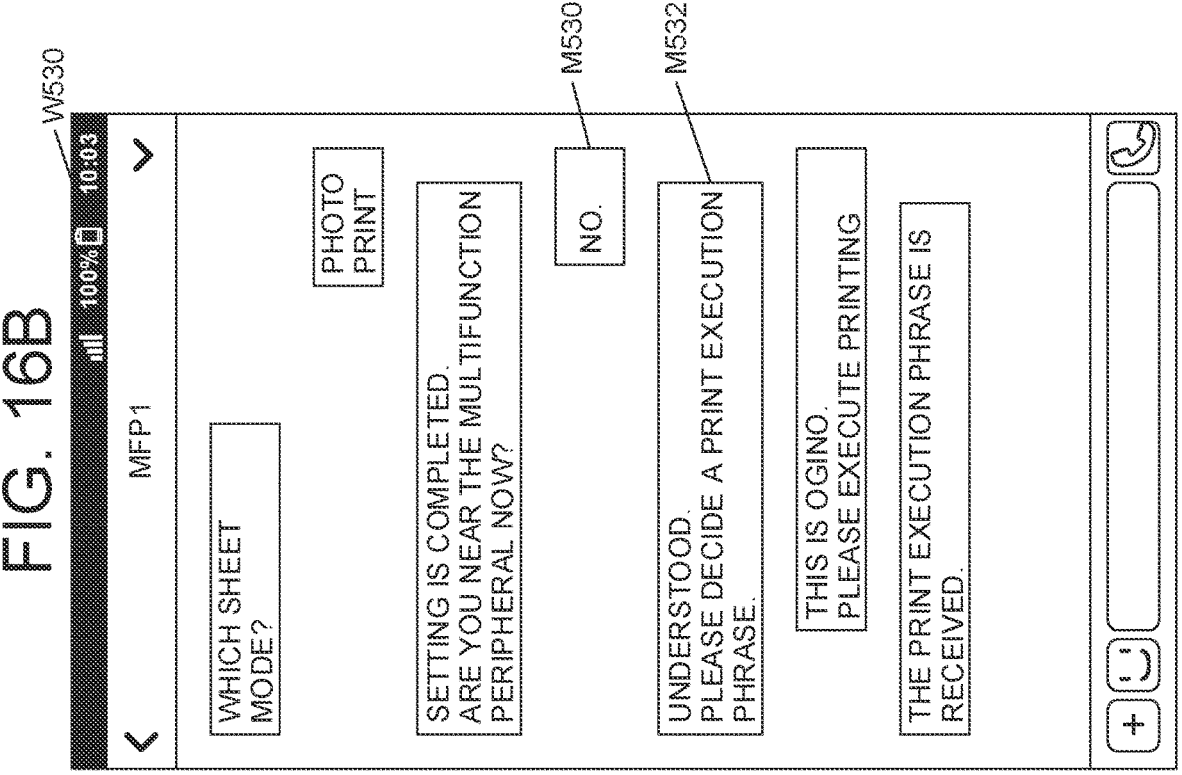
FIG. 16A and FIG. 16B are diagrams for describing an operation example according to the fifth embodiment.

FIG. 16A is a display example of a screen W520 displayed on the display 110 of the terminal device 10 owned by a user of the image forming apparatus 30 if a message indicating that the user is not in the vicinity of the image forming apparatus 30 is posted. For example, in response to a message inquiring whether the user is near the image forming apparatus 30, a message containing no positive content is posted by the user, as indicated in a message M520. In this case, as indicated in a message M522, a message concerning a case where the user reaches near the image forming apparatus 30 is posted from the image forming apparatus 30.

For example, as indicated in the message M522, if the user reaches near the image forming apparatus 30, the image forming apparatus 30 posts a message prompting the user to post a message having a character string "I'm here" in the posted content. In this case, the character string "I'm here" is a print execution phrase.

Figure 16B:
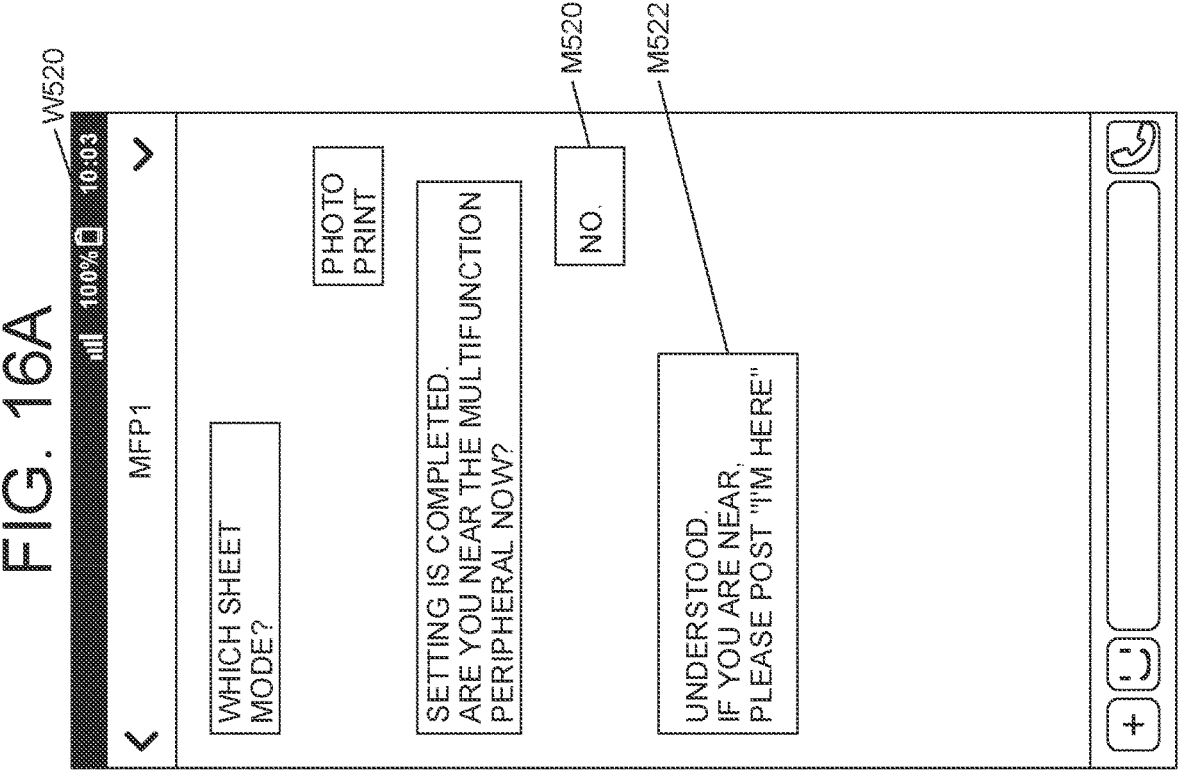

FIG. 16B is a display example of a screen W530 displayed on the display 110 of the terminal device 10 owned by a user of the image forming apparatus 30 if the print execution phrase is inquired when the user is not in the vicinity of the image forming apparatus 30. For example, as indicated in a message M530, if a message indicating that the user is not near the image forming apparatus 30 is posted, the image forming apparatus 30 may inquire about the print execution phrase as indicated in a message M532. Thus, the image forming apparatus 30 outputs the print data through a touch operation performed on the screen of the image forming apparatus 30 if the user is near the image forming apparatus 30, and through posting of the print execution phrase from the terminal device 10 if the user is not near the image forming apparatus 30.

According to the present embodiment, the image forming apparatus is capable of outputting the print data if a confirmation operation is performed by the user.

6. Sixth Embodiment

A sixth embodiment is an embodiment in which the user is made to select a payment method after a message including a print execution phrase is posted by the user.

The present embodiment can be applied to any of the first through fifth embodiments. Specifically, before executing step S114 in the main process, the message poster 306 posts a message for selecting a payment method. If a payment method is selected by the user, the controller 300 receives a money amount required to print the print data or executes a settlement process, based on the payment method selected by the user. Thereafter, in step S114, the print data output controller 312 outputs the print data. The settlement process may be performed after the end of the output of print data, that is, after the settlement amount is fixed. In this case, after executing step S114 in the main process, the message poster 306 posts a message for selecting the payment method. In this case too, if a payment method is selected by the user, the controller 300 receives a money amount required to print the print data or executes a settlement process, based on the payment method selected by the user.

An operation example according to the present embodiment is illustrated in FIG. 17. FIG. 17 is a display example of a screen W600 displayed on the display 110 of the terminal device 10 owned by the user of the image forming apparatus 30. As indicated in a message M600, after a message including the print execution phrase is posted by the user, the image forming apparatus 30 posts a message for selecting a payment method as indicated in a message M602.

At this time, as indicated in an area E600 in FIG. 17, the image forming apparatus 30 may display a button for the user to select a payment method onto the display 110 of the terminal device 10. For example, the area E600 includes a button B600 for selecting payment using a contactless payment service using the near field communication (NFC) technology, a button B602 for selecting payment by causing the image forming apparatus 30 to read a one-dimensional code or a two-dimensional code, and a button B604 for selecting a cash payment. In this case, the user may select the payment method by selecting the buttons displayed in the area E600. A button B606 for selecting another payment method (for example, a payment method by credit card or the like) may be included. If the button B606 is selected by the user, for example, the message poster 306 posts a payment method that the user can select.

The method of selecting a payment method may not be a button selection method. For example, when the user posts a message including a name of a payment method (for example, "cash" or "NFC"), the image forming apparatus 30 may determine that the payment method specified by the posted message is selected.

According to the present embodiment, the user can easily select a payment method in outputting print data.

7. Seventh Embodiment

A seventh embodiment is an embodiment in which print data can be output again even if output of the print data is canceled by a user.

Figure 18:
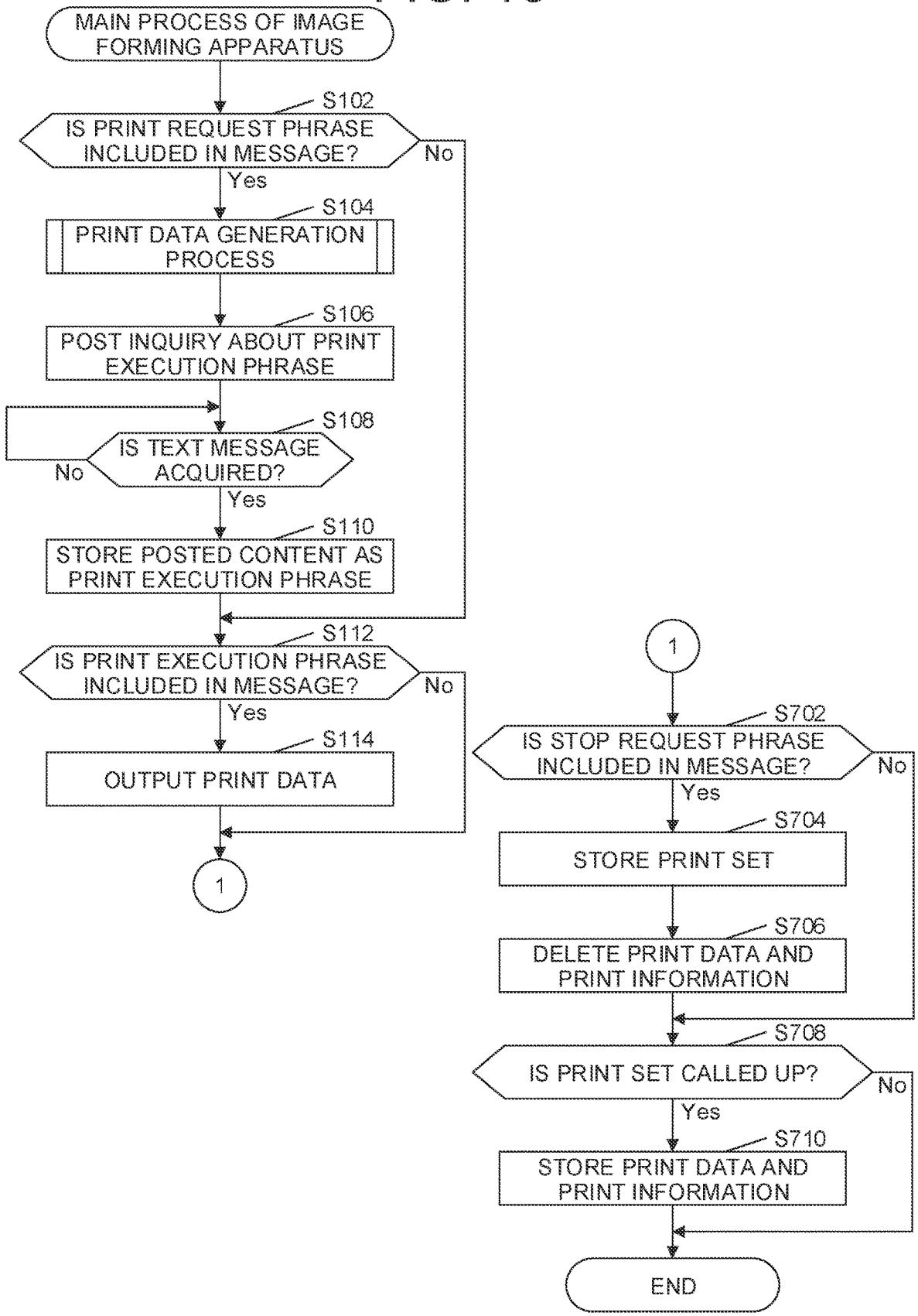
FIG. 18 is a flowchart for describing a flow of a main process of the image forming apparatus according to a seventh embodiment.

The present embodiment can be applied to any of the first through sixth embodiments. Next, a case where the present embodiment is applied to the first embodiment will be described with reference to FIG. 18.

In a main process of the present embodiment, the message determiner 304 determines whether the message includes a stop request phrase (step S702). The stop request phrase is a phrase indicating that the output of the print data is stopped (for example, "Cancel printing" or "Stop printing").

If the message includes a stop request phrase, the controller 300 stores the print data and print information stored in the process of step S104 into the storage 370 as a print set (step S702, Yes→step S704). The controller 300 deletes the print data stored in the processing of step S104 from the print data storage area 376, and deletes the print information from the print information storage area 378 (step S706). Thus, even if the user posts a message including the print execution phrase, the print data is not output from the image forming apparatus 30, and the output of the print data is canceled. At this time, the message poster 306 may post a message having the content that the print set is stored.

The controller 300 determines whether the print set stored in step S704 is called (step S708). For example, in a case where a button for calling a print set is included on the timeline displayed on the display 110 of the terminal device 10 owned by the user, if an operation of selecting the button for calling a print set is performed, the print set is called. The controller 300 determines that the print set is called if the controller 300 receives, from the server device 20 or the terminal device 10, information indicating that the operation of selecting the button for calling the print set is performed. When the print set is called, the message poster 306 may post a message having a content that the print set is called.

If the print set is called, the controller 300 stores the print data stored as the print set into the print data storage area 376, and stores the print information into the print information storage area 378 (step S708, Yes→step S710). Thus, if the user posts a message including the print execution phrase, the print data is output from the image forming apparatus 30.

Figure 19A:
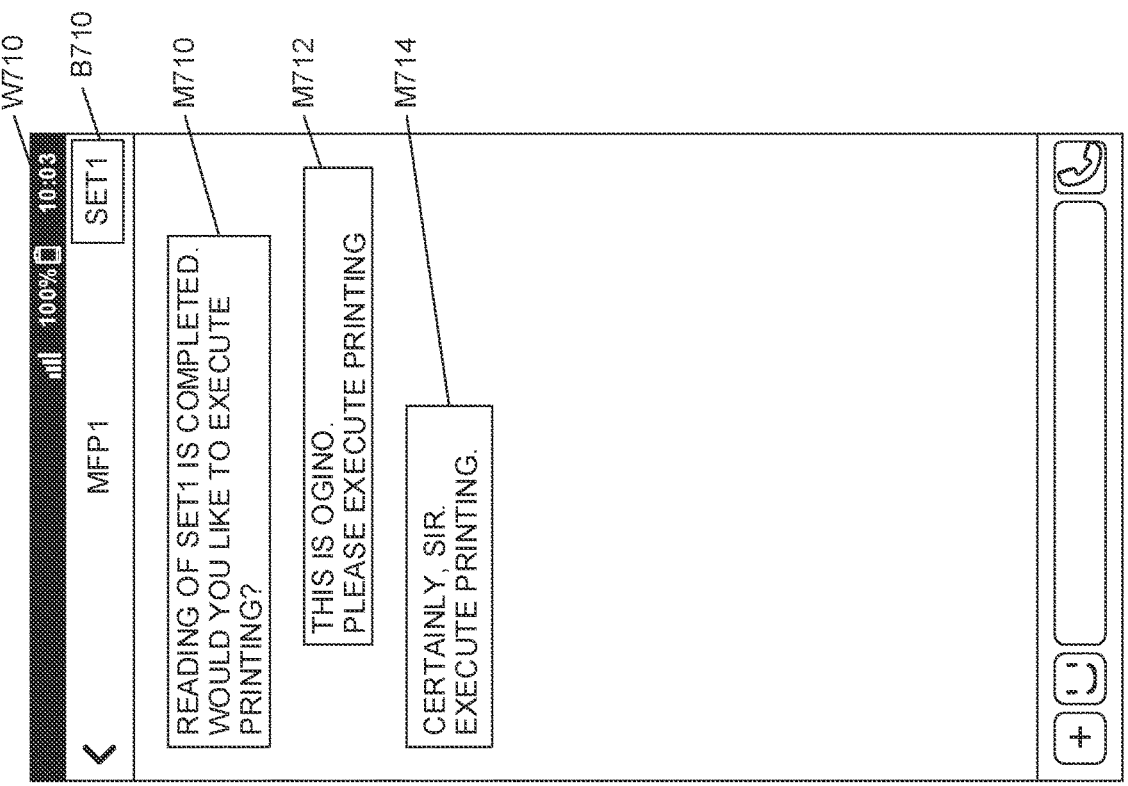
FIG. 19A and FIG. 19B are diagrams for describing an operation example according to a seventh embodiment.
Figure 19B:
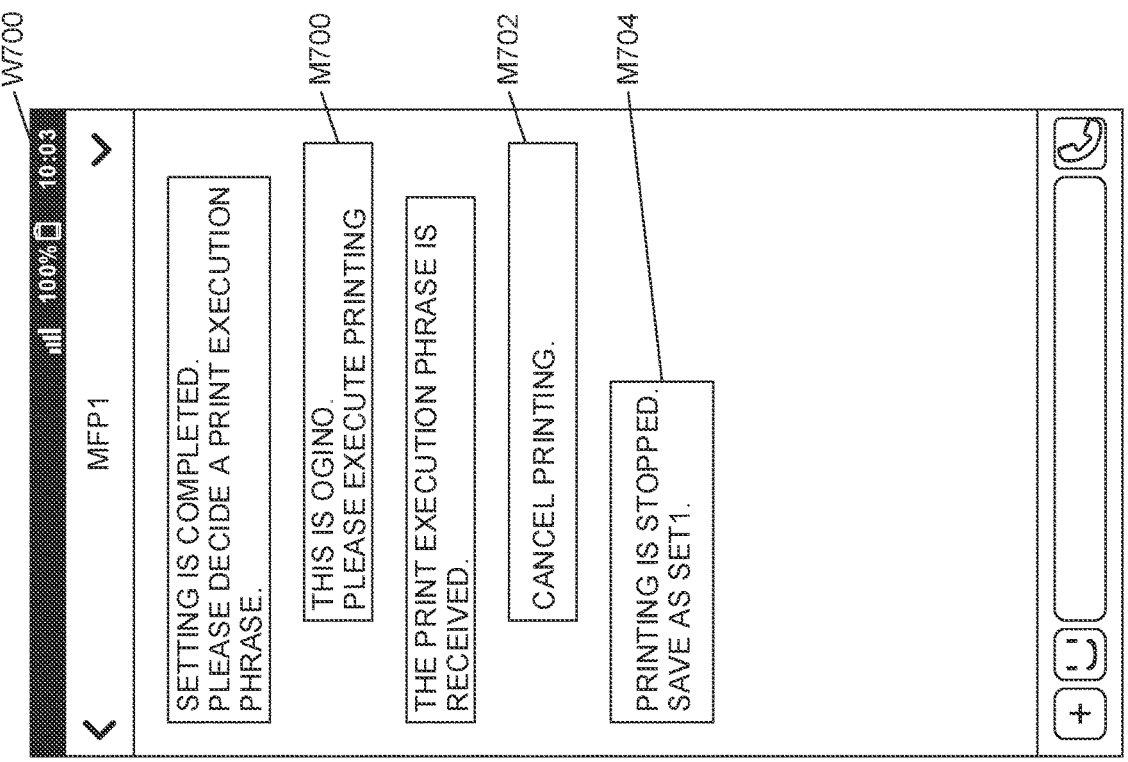

An operation example according to the present embodiment is illustrated in FIG. 19A and FIG. 19B. FIG. 19A is a display example of a screen W700 displayed on the display 110 of the terminal device 10 owned by the user of the image forming apparatus 30 until the print set is stored into the image forming apparatus 30. For example, as indicated in a message M700, after a print execution phrase is posted by the user, a message including a print stop phrase may be further posted by the user as indicated in a message M702. In this case, the image forming apparatus 30 stores the print set. A message M704 indicating that the print set is stored is posted from the image forming apparatus 30.

FIG. 19B is a display example of a screen W710 displayed on the display 110 of the terminal device 10 owned by the user of the image forming apparatus 30 until the print data is output from the image forming apparatus 30 after the print set is called. On the screen W710, for example, a button B710 for calling a print set is displayed. If the button B710 is selected by the user, the image forming apparatus 30 posts a message indicating that the print set is called, as indicated in a message M710.

If a message including a print execution phrase is posted by the user as indicated in a message M712, the image forming apparatus 30 posts a message having a content that printing is to be executed, as indicated in a message M714. Then, the print data is output from the image forming apparatus 30.

If the present embodiment is applied to from the second embodiment through the sixth embodiment, it is only required that the processing of steps S702 to S710 is executed in the main process of the image forming apparatus 30.

According to the present embodiment, the user can output the print data again even if the output of the print data is canceled once.

8. Modification

The present invention is not limited to the above embodiments, and can have various modifications. That is, embodiments obtained by combining technical means appropriately changed within the scope not departing from the gist of the present invention are also included in the technical scope of the present invention.

Although the above-described embodiments have portions described separately for convenience of description, it is needless to say that the embodiments may be combined and executed within a technically possible range.

In addition, a program operating in each of the devices in the embodiments is a program (a program for causing a computer to function) for controlling a CPU and the like to realize the functions of the above-described embodiments. Information processed by these devices is temporarily stored in a temporary storage device (such as a RAM) at the time of processing the information, and then stored in storage devices such as various types of read only memories (ROMs) and HDDs, and read or corrected and written by the CPU, as necessary.

Here, examples of a recording medium for storing the program may include a semiconductor medium (such as a ROM and a non-volatile memory card), an optical recording medium/magneto-optical recording medium (such as a Digital Versatile Disc (DVD), a Magneto Optical Disc (MO), a Mini Disc (MD), a Compact Disc (CD), and a Blu-ray Disc (BD) (registered trademark)), and a magnetic recording medium (such as magnetic tape and a flexible disk). If the loaded program is executed, not only the functions of the above-described embodiments may be realized, but also the functions of the present invention may be realized as a result of performing processing in cooperation with an operating system, another application program, or the like, based on instructions of the program and performed.

If the program is distributed to a market, the program may be stored in a portable recording medium to the distributed, or the program may be transferred to a server computer connected via a network such as the Internet. In this case, of course, a storage device of the server computer is also included in the present invention.

What is claimed is:

1. An image forming apparatus, comprising:
   a message acquirer that acquires a plurality of messages from a server, the plurality of messages comprising messages that are posted on each of a plurality of devices in a chronological order;
   a print data generator that generates print data based on a first message posted in the plurality of messages;
   a print information manager that stores print information which includes the print data and a print execution phrase included in a second message posted after the first message in the plurality of messages;
   a message determiner that determines whether the same print execution phrase is included in a third message posted after the second message in the plurality of messages; and
   a print data output controller that outputs the print data when the message determiner determines that the same print execution phrase is also included in the third message,
   wherein the print execution phrase is a text comprising a character string decided by a user of at least one of the plurality of devices.

2. A control method, comprising:
   acquiring a plurality of messages from a server, the plurality of messages comprising messages that are posted on each of a plurality of devices in a chronological order;
   generating print data based on a first message posted in the plurality of messages;
   storing print information which includes the print data and a print execution phrase included in a second message posted after the first message in the plurality of messages;
   determining whether the same print execution phrase is included in a third message posted after the second message in the plurality of messages; and
   outputting the print data when the same print execution phrase is determined to be also included in the third message,
   wherein the print execution phrase is a text comprising a character string decided by a user of at least one of the plurality of devices.

* * * * *